United States Patent
Saito et al.

(10) Patent No.: US 10,087,917 B2
(45) Date of Patent: Oct. 2, 2018

(54) PUMP DEVICE

(71) Applicant: Hitachi Automotive Systems, Ltd., Hitachinaka-shi, Ibaraki (JP)

(72) Inventors: Masayuki Saito, Sagamihara (JP); Chiharu Nakazawa, Kawasaki (JP); Masaki Misunou, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 640 days.

(21) Appl. No.: 14/402,726

(22) PCT Filed: May 20, 2013

(86) PCT No.: PCT/JP2013/063911
§ 371 (c)(1),
(2) Date: Nov. 21, 2014

(87) PCT Pub. No.: WO2013/176076
PCT Pub. Date: Nov. 28, 2013

(65) Prior Publication Data
US 2015/0159638 A1   Jun. 11, 2015

(30) Foreign Application Priority Data
May 22, 2012 (JP) .................. 2012-116779

(51) Int. Cl.
F04B 11/00 (2006.01)
B60T 8/44 (2006.01)
B60T 8/48 (2006.01)
B60T 8/50 (2006.01)
B60T 17/02 (2006.01)
F04C 15/00 (2006.01)
(Continued)

(52) U.S. Cl.
CPC .......... F04B 11/0091 (2013.01); B60T 8/442 (2013.01); B60T 8/4872 (2013.01);
(Continued)

(58) Field of Classification Search
CPC ....... F16K 47/08; F16K 47/14; B60Y 8/4068; B60Y 8/442; F04C 2/10; F04C 2/344;
(Continued)

(56) References Cited

U.S. PATENT DOCUMENTS 2,767,733 A * 10/1956 Anderson ................. B60S 1/10
                                                    137/497
4,712,583 A * 12/1987 Pelmulder ............. A61M 39/24
                                                    137/494
(Continued)

FOREIGN PATENT DOCUMENTS

DE       4016755 A1 * 11/1991 ............. B60T 8/341
JP       52-152424 U    11/1977
(Continued)

OTHER PUBLICATIONS

International Search Report (PCT/ISA/210) dated Aug. 20, 2013 with English-language translation (Four (4) pages).
(Continued)

Primary Examiner — Devon Kramer
Assistant Examiner — Joseph Herrmann
(74) Attorney, Agent, or Firm — Crowell & Moring LLP

(57) ABSTRACT

An object of the present invention is to provide a pump device that is capable of improving a discharge performance. A first orifice 301 that is provided on a discharge oil passage (a pipe 12) of a pump 2 and a second orifice 302 that, when a flow amount Q becomes greater than a predetermined flow amount Q1, allows pass of brake fluid are provided.

9 Claims, 10 Drawing Sheets

(51) Int. Cl.
*F04B 53/10* (2006.01)
*F04C 2/10* (2006.01)
*F04C 2/344* (2006.01)

(52) U.S. Cl.
CPC ............ B60T 8/5037 (2013.01); B60T 17/02 (2013.01); F04B 11/00 (2013.01); F04B 53/1067 (2013.01); F04C 15/0049 (2013.01); *F04C 2/10* (2013.01); *F04C 2/344* (2013.01); *F04C 2240/30* (2013.01)

(58) Field of Classification Search
CPC ........................ F04C 15/0049; F04C 2240/30; F15B 21/008; F15B 2211/8616; F04B 11/00; F04B 11/0091; F04B 53/1067; B60T 8/4872; B60T 8/5037; B60T 17/02
See application file for complete search history.

(56) References Cited

U.S. PATENT DOCUMENTS

| | | | | |
|---|---|---|---|---|
| 4,867,200 A | * | 9/1989 | Markley | F16K 15/028 137/515.7 |
| 5,058,961 A | * | 10/1991 | Mergenthaler | B60T 8/341 303/115.4 |
| 5,265,943 A | * | 11/1993 | Kehl | B60T 8/4068 303/113.1 |
| 5,964,510 A | * | 10/1999 | Nakazawa | B60T 8/4022 303/116.4 |
| 6,003,958 A | * | 12/1999 | Volz | B60T 8/3675 303/116.1 |

FOREIGN PATENT DOCUMENTS

| | | |
|---|---|---|
| JP | 2000-154898 A | 6/2000 |
| JP | 2000-185638 A | 7/2000 |

OTHER PUBLICATIONS

Machine translation of JP 6-79677 U dated Nov. 8, 1994 (Ten (10) pages).
Machine translation of JP 52-152424 U dated Nov. 18, 1977 (Five (5) pages).
Machine translation of JP 63-164678 U dated Oct. 26, 1988 (Seven (7) pages).
Machine translation of JP 2011-5887 A dated Jan. 13, 2011 (Eighteen (18) pages).

* cited by examiner

TYPICAL

SHIFT

NO PISTON

PUMP DEVICE

TECHNICAL FIELD

The present invention relates to a pump device.

BACKGROUND ART

In a related art, there is known a pump device having a pulsation reduction unit to reduce pulsation of fluid that flows out from a pump. For instance, Patent Document 1 discloses a pump device having, as the pulsation reduction unit, a variable aperture, aperture resistance of which changes according to a discharge flow amount.

CITATION LIST

Patent Document

Patent Document 1: Japanese Patent Application Publication No. JP2011-5887

SUMMARY OF THE INVENTION

Technical Problem

However, in a case of technique of the related art, there is still room for improvement in discharge performance of the pump. An object of the present invention is to provide a pump device that is capable of improving the discharge performance.

Solution to Problem

To achieve the object, a pump device of the present invention preferably has a first orifice that is provided on a discharge passage of a pump and a second orifice that allows pass of brake fluid when a discharge flow amount becomes greater than a predetermined flow amount.

Effects of the Invention

Therefore, it is possible to improve the discharge performance.

EMBODIMENTS FOR CARRYING OUT THE INVENTION

In the following description, embodiments of a pump device of the present invention will be explained with reference to the drawings.

Embodiment 1

Figure 1:
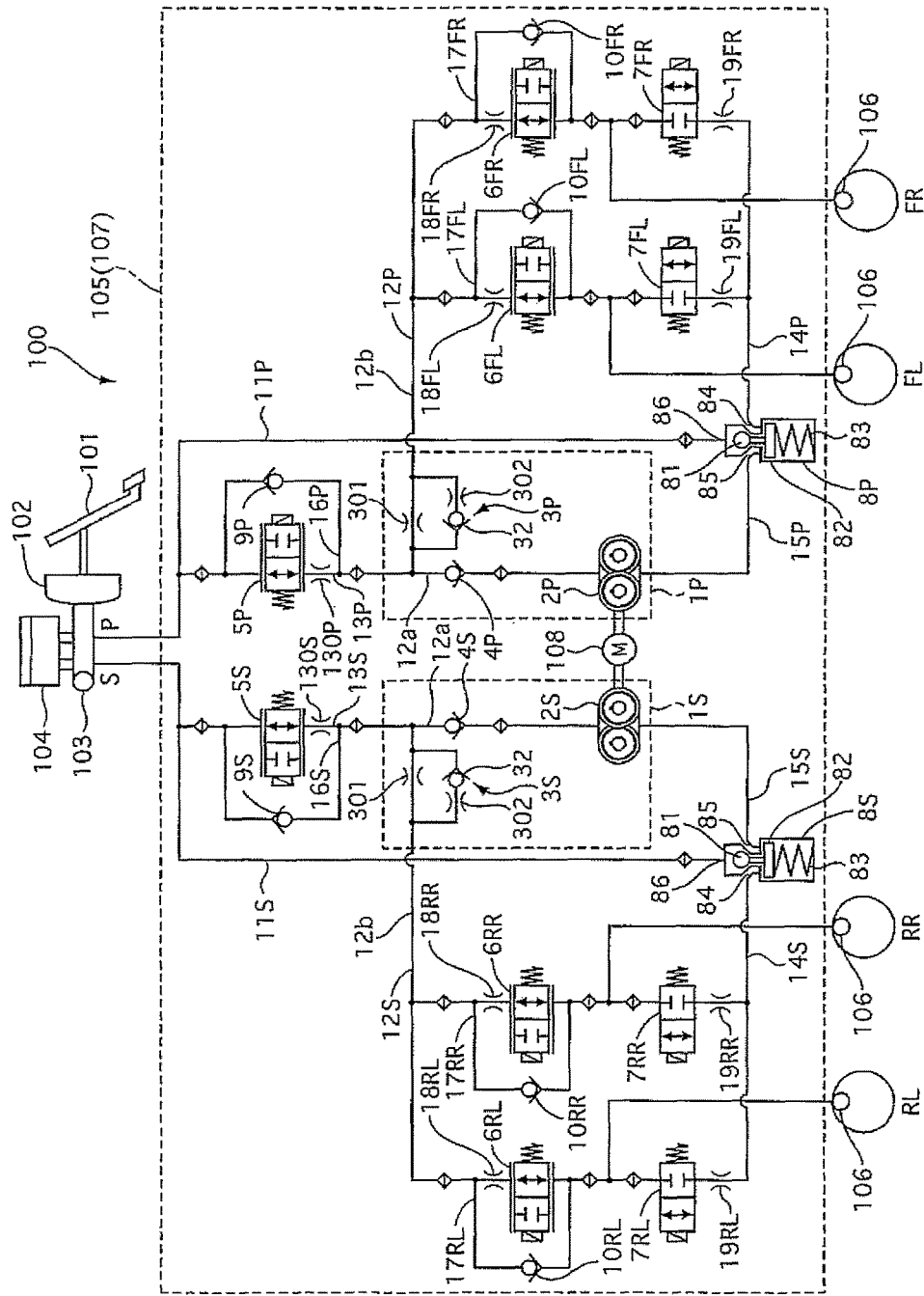
FIG. 1 is a drawing of a hydraulic circuit of a brake control device to which a pump device of an embodiment 1 is applied.

FIG. 1 is a circuit diagram showing a configuration of a hydraulic circuit of a brake control device to which a pump device 1 of an embodiment 1 is applied. The brake control device is a hydraulic pressure control device that is applied to a hydraulic brake system generating a braking force by providing a brake fluid pressure to each wheel of a vehicle (automobile) and controls the brake fluid pressure of the vehicle. The vehicle is a hybrid vehicle, for instance, whose front wheels FL, FR are driven by an engine and whose rear wheels RL, RR are driven by a motor/generator. In the hybrid vehicle, by rotating the motor/generator using kinetic energy of the vehicle and generating electric power, a regenerative braking force can be generated. The brake control device has a master cylinder 103 that is connected to a brake pedal 101 through a brake booster 102 and produces a hydraulic pressure (a master cylinder pressure) according to a brake pedal operation, a hydraulic pressure control unit 105 that is connected to the master cylinder 103 and provides the master cylinder pressure or a generated control hydraulic pressure to a wheel cylinder (W/C) 106 of each of the wheels FL, FR, RL and RR of the vehicle, and a control unit (an electronic control unit) (not shown) that controls operation of the hydraulic pressure control unit 105.

The brake pedal 101 works according to driver's brake pedal operation, and transmits driver's brake pedal operating force (a pedal depression force) to the brake booster 102. The brake booster 102 is a negative pressure booster (a vacuum booster) to assist the driver's brake pedal operating force. The brake booster 102 amplifies a force transmitted from the brake pedal 101 using a negative pressure produced by the engine, and transmits the amplified force to the master cylinder 103 then operates the master cylinder 103 (a piston of the master cylinder 103). The master cylinder 103 produces the master cylinder pressure in proportion to the force transmitted from the brake booster 102. The master cylinder 103 is a tandem type master cylinder, and has two hydraulic chambers that are defined by two master cylinder pistons. The two hydraulic chambers each receive supply of working fluid (the brake fluid) from a reservoir tank 104, and produce the substantially same master cylinder pressures according to the driver's brake pedal operation. One hydraulic chamber is connected to a P line pipe, and the other hydraulic chamber is connected to an S line pipe. The reservoir tank 104 is a brake fluid source that stores the brake fluid. The reservoir tank 104 is open under atmospheric pressure. The hydraulic pressure control unit 105 is a brake hydraulic pressure generating source that is provided with the brake fluid from the brake fluid source (the reservoir tank 104 or the master cylinder 103) and can generate a wheel cylinder pressure (the brake hydraulic pressure) independently of the driver's brake pedal operation. In the hydraulic pressure control unit 105, a brake fluid pressure circuit (the hydraulic circuit) is arranged and the pump device 1 and a plurality of control valves are provided in a housing 107. By controlling these actuators according to a control command from the control unit, the hydraulic pressure control unit 105 can perform an active control of the wheel cylinder pressure. The hydraulic pressure control unit 105 is installed, for instance, in an engine room of the vehicle.

With regard to the control unit, for instance, when the braking force only by a regenerative braking force lacks for driver's demand braking force upon brake pedal depression braking, the control unit performs a regenerative brake cooperative control that controls the wheel cylinder pressure so as to compensate the lack of the braking force with a hydraulic pressure braking force. Further, the control unit is provided so as to be able to control the wheel cylinder pressure of each wheel to perform controls such as automatic brake control for a following distance control, an anti-skid brake control (ABS control) that reduces tendency of lock of the wheel, a vehicle dynamics control (VDC control) that stabilizes a vehicle attitude by controlling the hydraulic pressure braking force of a certain wheel during cornering, and a collision reduction control (BA control) that reduces danger of collision such as fast approach.

In the following description, an element or a component that is each provided for the four wheels FL, FR, RL and RR is distinguished by attaching a reference sign FL, FR, RL or RR. Further, the element or the component that is each provided for the P and S line pipes is distinguished by attaching a reference sign P or S.

The wheel cylinder 106FL of the front left wheel and the wheel cylinder 106FR of the front right wheel are connected to the P line pipe, while the wheel cylinder 106RL of the rear left wheel and the wheel cylinder 106RR of the rear right wheel are connected to the S line pipe, which form a brake pipe arrangement that is so-called a front-rear piping system. However, a so-called X-piping arrangement (x-piping system) is possible, and the pipe arrangement is not especially limited. The P line pipe and the S line pipe are each provided with a pump 2. These pumps 2P and 2S are tandem type pumps driven by one motor 108. The pumps 2P and 2S pump up the brake fluid from reservoirs 8 and build up the brake fluid pressure, then provide a high pump discharge pressure to a downstream side (solenoid-in valves 6). Here, the pump is not limited to the tandem type pump, and one pump could be driven by one motor. The motor 108 is an electric motor, more specifically, a brushless motor DC motor. However, a brush motor and an AC motor could be used. The control unit controls a discharge flow amount of the pump 2 by controlling a revolution speed (a motor speed) of the motor 108 by a command current.

The master cylinder 103 and a suction side of the pump 2 are connected through a pipe 11 etc. More specifically, the reservoir 8 having a check valve function is provided on the suction side of the pump 2, and the master cylinder 103 and the reservoir 8 are connected through the pipe 11, and the reservoir 8 and the pump 2 are connected through a pipe 15.

The pipe 15 is a suction oil passage of the pump 2. The pipes 11 and 15 form a control brake circuit (the suction side) that provides the brake fluid of the master cylinder 103 or the reservoir 8 to the suction side of the pump 2. A discharge side of the pump 2 and each wheel cylinder 106 are connected through a pipe 12. The pipe 12 is a discharge oil passage of the pump 2. The pipe 12 forms a control brake circuit (the discharge side) that provides the brake fluid (the brake fluid pressure) built up by the pump 2 to each wheel cylinder 106. The solenoid-in valve 6 that is a pressure-increase control valve, corresponding to each wheel cylinder 106, is provided on the pipe 12. The solenoid-in valve 6 is a normally-open electromagnetic valve that is open in a non-energization state, and is a so-called proportional valve whose valve opening proportionally varies according to current that flows to a solenoid. The solenoid-in valve 6 performs an open/close action by the command current from the control unit, and opens/closes the pipe 12. The pipe 12 is provided with an orifice 18 at a pump 2 side with respect to the solenoid-in valve 6. A pipe 17 that bypasses the solenoid-in valve 6 (and the orifice 18) is provided on the pipe 12. This pipe 17 is provided with a check valve (a non-return valve) 10. The check valve 10 allows a flow of the brake fluid in a direction from the wheel cylinder 106 toward the pump 2, and forbids a brake fluid flow of the opposite direction. Further, a check valve 4 and a pulsation reduction unit 3 are provided between the pump 2 and the solenoid-in valve 6 on the pipe 12. The check valve 4 allows a flow of the brake fluid in a direction from the pump 2 toward the solenoid-in valve 6, and forbids a brake fluid flow of the opposite direction. The pulsation reduction unit 3 is provided at a downstream side of the check valve 4 on the discharge side of the pump 2.

The master cylinder 103 and the pipe 12 are connected through a pipe 13. The pipe 13 connects to the pipe 12 between the pump 2 and the solenoid-in valve 6, more specifically, between the check valve 4 and the pulsation reduction unit 3. A gate-out valve 5 is provided on the pipe 13. A normal brake circuit that provides the brake fluid from the master cylinder 103 to the wheel cylinder 106 is formed by an arrangement of "the master cylinder 103→the pipe 13→the pipe 12→the wheel cylinder 106". The gate-out valve 5 is a normally-open proportional electromagnetic valve, and is a cutoff valve (or a shutoff valve) that performs an open/close action by the command current from the control unit and opens/closes the pipe 13 (the normal brake circuit). Here, the gate-out valve 5 is not limited to the proportional valve. The gate-out valve 5 could be an ON/OFF control valve or a duty control valve. The pipe 13 is provided with an orifice 130 at a pipe 12 side with respect to the gate-out valve 5. A pipe 16 that bypasses the gate-out valve 5 (and the orifice 130) is provided on the pipe 13. This pipe 16 is provided with a check valve 9. The check valve 9 allows a flow of the brake fluid in a direction from the master cylinder 103 side toward the wheel cylinder 106, and forbids a brake fluid flow of the opposite direction. The wheel cylinder 106 and the pipe 15 are connected through a pipe 14, and the pipe 14 and the pipe 15 are joined at the reservoir 8. The pipe 14 forms a pressure-decrease circuit that returns the brake fluid from each wheel cylinder 106 to the reservoir 8 and decreases the pressure of the wheel cylinder 106. A solenoid-out valve 7 that is a normally-closed electromagnetic valve is provided on the pipe 14. The solenoid-out valve 7 is a normally-closed ON/OFF electromagnetic valve, and is a pressure-decrease control valve that performs an open/close action by the command current from the control unit and opens/closes the pipe (the pressure-decrease circuit). The pipe 14 is provided with an orifice 19 at the reservoir 8 side with respect to the solenoid-out valve 7.

The reservoir 8 has an inflow port 84 connecting to a downstream of the solenoid-out valve 7 through the pipe 14, an outflow port 85 connecting to the suction side of the pump 2 through the pipe 15 and a master cylinder port 86 connecting to the master cylinder 103 through the pipe 11. Further, the reservoir 8 has a piston 82 forced by a return spring 83 and a check valve 81 moving or working integrally with this piston 82. When the driver depresses the brake pedal 101 and the pressure is applied from the master cylinder 103 side, the check valve 81 is brought to a closed state (a state in which the return spring 83 is pressed down by the piston 82). With this working, inflow of the brake fluid from the master cylinder 103 side to the suction side of the pump 2 is suppressed. On the other hand, when the pump 2 works, the inflow of the brake fluid from the master cylinder 103 side to the suction side of the pump 2 is given high priority and becomes effective. For instance, in a case of a pressure-decrease action of the ABS control etc., in order to decrease the pressure of, e.g. the wheel cylinder 106RR of the rear right wheel, when the solenoid-out valve 7RR is opened and the pump 2S is operated, the brake fluid in the wheel cylinder 106RR flows into the reservoir 8S from the inflow port 84 through the pipe 14S and is provided to the pump 2S from the outflow port 85 through the pipe 15S by the suction of the pump 2S. Here, an effective pressure receiving area of the piston 82 is set to be greater than an effective pressure receiving area of the check valve 81. Because of this, even in a case where the master cylinder pressure is high, when the suction action of the pump 2S is carried out, the check valve 81 is upwardly pushed up and is held at a balanced position. Thus, the brake fluid is sucked from the master cylinder 103 side as necessary.

The control unit inputs information about a travel condition (or a travelling state) transmitted from a sensor (not shown) and the vehicle, and controls open/close of each of the gate-out valve 5, the solenoid-in valve 6 and the solenoid-out valve 7 and the drive of the motor 108 (the discharge flow amount of the pump 2) on the basis of a stored program. For instance, during execution of the regenerative brake cooperative control, upon increase of the hydraulic pressure braking force, a valve opening amount of the gate-out valve 5 is controlled, the solenoid-in valve 6 is opened, the solenoid-out valve 7 is closed, the motor 108 is ON, and the pump 2 is driven. With this operation, the pump discharge pressure is provided to the wheel cylinder 106. Further, upon decrease of the hydraulic pressure braking force, the valve opening amount of the gate-out valve 5 is controlled, the solenoid-in valve 6 is opened, the solenoid-out valve 7 is closed, the motor 108 is OFF, and the pump 2 is stopped. With this operation, the wheel cylinder pressure (the brake fluid in the wheel cylinder) is drawn to the master cylinder 103 through the gate-out valve 5 while securing the wheel cylinder pressure by an amount equivalent to a difference between the driver's demand braking force and the braking force by the master cylinder pressure.

Next, a configuration of the pump device 1 will be explained. The P line pipe and the S line pipe have the same configuration. The pump device 1 has the pump 2 and the pulsation reduction unit 3. The pump 2 is a rotary pump, and sucks/discharges the brake fluid as a fluid. In the embodiment 1, as the pump 2, a gear pump, more specifically, an external gear pump, which has an excellent noise vibration performance as compared with a plunger pump etc., is used. However, an internal gear pump could be used. Also the plunger pump or a vane pump might be used, and the pump 2 is not especially limited. The check valve 4 is a delivery valve of the pump 2. The check valve 4 allows only a flow of the brake fluid in a discharge direction of the pump 2 (in a direction from a discharge portion of the pump 2 toward a connecting portion between the pipes 12 and 13), and suppresses inflow of the brake fluid to the discharge portion of the pump 2. The check valve 4 prevents a high pressure from the master cylinder 103 side by the driver's brake pedal operation from acting on the discharge portion (an outlet port) of the pump 2 through the pipe 13 and the pipe 12, thereby increasing durability of the pump 2.

Figure 2:
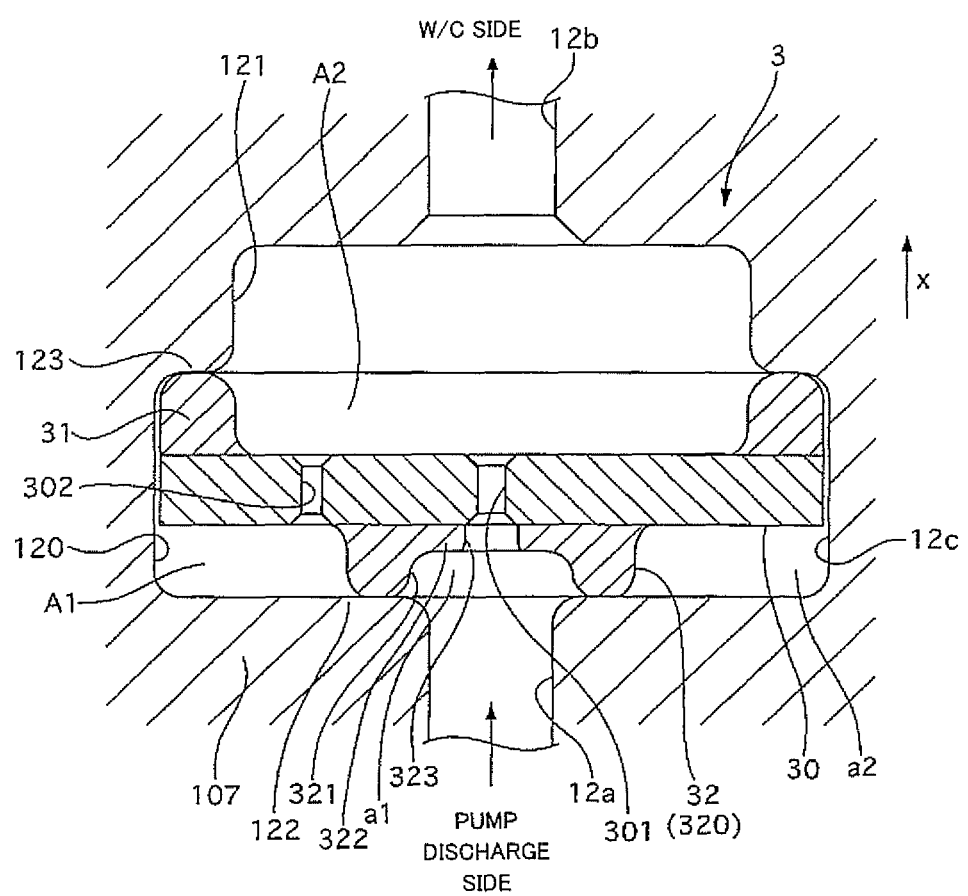
FIG. 2 is a sectional view in an axial direction of a pulsation reduction unit of the embodiment 1.

FIG. 2 shows a sectional view in an axial direction of the pulsation reduction unit 3 (a sectional view when cut by a plane passing through an axial center of the pulsation reduction unit 3). Here, a pump 2 side (a pump discharge side) is an upstream side of the pipe 12, while a wheel cylinder 106 side is a downstream side of the pipe 12. The pulsation reduction unit 3 is a pulsation absorption unit that absorbs the pulsation of the brake fluid discharged from the pump 2, and the pulsation reduction unit 3 reduces the pulsation. An upstream side of the pipe 12 forming the discharge oil passage of the pump 2 with respect to the pulsation reduction unit 3 is a pump side pipe 12a, and a downstream side of the pipe 12 with respect to the pulsation reduction unit 3 is a wheel side pipe 12b. The pump side pipe 12a and the wheel side pipe 12b are set so as to extend in the substantially same line. For convenience in explanation, a direction in which the pipe 12 extends is an X-axis, and a direction from the upstream side toward the downstream side is a positive direction (a forward direction). The pulsation reduction unit 3 is installed in a space (a shock absorption chamber) 12c provided at the downstream side of the check valve 4 on the pipe 12 in the housing 107. The space 12c is formed into an annular shape (an almost cylindrical shape) whose center is an axis of the pipe 12 (the pipes 12a, 12b). In other words, the space 12c is a ring-shaped space (or a doughnut-shaped space), and the pipe 12 is set at a position including the center of this doughnut-shaped space. The space 12c has a stepped-shape having a large diameter first space 120 at an upstream side and a second space 121 whose diameter is smaller than that of the first space 120 and larger than that of the pipe 12 at a downstream side. The first space 120 and the second space 121 are both formed into an annular shape (an almost cylindrical shape), and are provided substantially coaxially with each other. The housing 107 is provided with a first step (a wall portion 122 at an upstream side of the first space 120) at a connecting portion between the pump side pipe 12a and the first space 120, and also provided with a second step (a wall portion 123 at a downstream side of the first space 120) at a connecting portion between the first space 120 and the second space 121.

The pulsation reduction unit 3 has a diaphragm 30, a spring element 31, an orifice 300 (a first orifice 301 and a second orifice 302) as an aperture mechanism and a relief mechanism 32. The diaphragm 30 is a flat plate (an orifice plate) on which the orifice 300 is formed. The diaphragm 30 is formed into a ring shape (a disc shape) whose diameter is slightly smaller than that of the first space 120. The diaphragm 30 is a dividing member that is provided in the space 12c, more specifically, in the first space 120 and divides or partitions the space 12c into two chambers of a chamber A1 at an upstream side and a chamber A2 at a downstream side. The diaphragm 30 is set so as to be able to move in an X-axis direction in the first space 120. A volume of the upstream side chamber A1 varies according to an X-axis direction movement of the diaphragm 30, and the chamber A1 functions as a variable volume chamber.

The spring element 31 is an elastic body, more specifically, a rubber spring which is provided in the first space 120 and elastically supports the diaphragm 30. The spring element 31 is placed between the wall portion 123 at the downstream side of the first space 120 and the diaphragm 30 (i.e. placed in the downstream side chamber A2). The spring element 31 is formed into a ring shape. A diameter of an outer peripheral surface of the ring-shaped spring element 31 is set to be substantially the same as that of the diaphragm 30. A diameter of an inner peripheral surface of the ring-shaped spring element 31 is set to be substantially the same as that of an inner peripheral surface of the second space 121. An X-axis negative direction end portion of the spring element 31 is bonded and fixed to an X-axis positive direction end surface of the diaphragm 30. An X-axis positive direction end portion of the spring element 31 has a substantially half-round (or semicircular) bulging surface in axial cross section (cross section when cut by a plane passing through an axial center of the spring element 31). The spring element 31 forces the diaphragm 30 in an X-axis negative direction with the X-axis positive direction end portion of the spring element 31 touching the wall portion 123 and with the spring element 31 compressed in the X-axis direction in the downstream side chamber A2. That is, the chamber A2 functions as a forcing chamber. Further, by the fact that the X-axis positive direction end portion of the spring element 31 touches the wall portion 123, an inner peripheral side and an outer peripheral side of the spring element 31 in the chamber A2 are liquid-tightly defined (or divided). With this structure, a flow (a leak) of the brake fluid between the upstream side chamber A1 and the downstream side chamber A2 through a gap appearing at an outer peripheral side of the diaphragm 30 and the outer peripheral side of the spring element 31 is stopped. That is, the spring element 31 also has a sealing function.

The relief mechanism 32 has a valve body 320. The valve body 320 is an elastic body, more specifically, a rubber seal which is provided in the first space 120 and is fixed to the diaphragm 30. The valve body 320 might be formed by synthetic resin etc. The valve body 320 is placed between the wall portion 122 at the upstream side of the first space 120 and the diaphragm 30 (i.e. placed in the upstream side chamber A1). The valve body 320 is formed into a ring shape having an axial direction penetration hole. A diameter of an outer peripheral surface of the ring-shaped valve body 320 is set to be smaller than that of the inner peripheral surface of the spring element 31 (the valve body 320 is formed so that a difference between the diameter of the outer peripheral surface of the valve body 320 and the diameter of the inner peripheral surface of the spring element 31 exists at least by a size of a diameter of the second orifice 302). A diameter of an inner peripheral surface of the valve body 320 at a thin plate annular portion 322 on an X-axis positive direction side (i.e. a diameter of an axial direction penetration hole 323 of the annular portion 322) is set to be slightly greater than that of the first orifice 301. A diameter of the inner peripheral surface of the valve body 320 at a cylindrical portion 321 on an X-axis negative direction side is set to be slightly greater than that of the pump side pipe 12a. An X-axis positive direction end portion of the valve body 320 is bonded and fixed to an X-axis negative direction end surface of the diaphragm 30. An X-axis negative direction end portion of the valve body 320 (the cylindrical portion 321) has a substantially half-round (or semicircular) bulging surface in axial cross section (cross section when cut by a plane passing through an axial center of the valve body 320).

The valve body 320 is forced in the X-axis negative direction by an energizing force of the spring element 31 which acts on the diaphragm 30. In a state in which there is no pressure difference between an upstream side and a downstream side of the diaphragm 30, the X-axis negative direction end portion of the valve body 320 is pressed against the wall portion 122 in the upstream side chamber A1. The valve body 320 produces a reaction force with the valve body 320 slightly compressed in the X-axis direction, then forces the diaphragm 30 in the X-axis positive direction. In other words, the diaphragm 30 is supported in the axis direction by the spring element 31 and the valve body 320. The X-axis negative direction end portion of the valve body 320 (the cylindrical portion 321) touches the wall portion 122 so as to encircle an opening of the pump side pipe 12a. In other words, a periphery of the opening of the pump side pipe 12a at the wall portion 122 serves as a valve seat of the relief mechanism 32 (the valve body 320). By the fact that the X-axis positive direction end portion of the valve body 320 is bonded and fixed to the diaphragm 30 and the X-axis negative direction end portion of the valve body 320 touches the wall portion 122, an inner peripheral side space a1 and an outer peripheral side space a2 of the valve body 320 are defined in the upstream side chamber A1. The valve body 320 is an annular seal member that stops a flow (a leak) of the brake fluid between the space a1 and the space a2. Here, as long as the valve body 320 performs a sealing function with the valve body 320 touching the wall portion 122, the valve body 320 could be formed by material except the elastic body (a forcing member). By employing the elastic body, the sealing function (sealing performance) can be increased by a simple structure. The inner peripheral side space a1 communicates with the pump side pipe 12a all the time. When the diaphragm 30 moves to the X-axis positive direction side and the X-axis negative direction end portion of the valve body 320 separates from the wall portion 122, an annular passage b (see FIG. 3) that connects the space a1 and the space a2 is formed between the X-axis negative direction end portion of the valve body 320 and the wall portion 122. That is, the valve body 320 is a valve member that switches between connection and isolation of the space a1 and the space a2 by an open/close action.

The orifice 300 has the first orifice 301 and the second orifice 302. The first orifice 301 is provided in the substantially middle (at an axial center position) of the disc-shaped diaphragm 30. The first orifice 301 is formed by penetrating the diaphragm 30 in the axial direction. The valve body 320 (the axial direction penetration hole 323 of the valve body 320) and the diaphragm 30 (the first orifice 301) are coaxially aligned with the pipe 12 (the pipes 12a and 12b). A diameter of the first orifice 301 is set to be smaller than that of the pipe 12 (the pipes 12a and 12b). The second orifice 302 is formed by penetrating the diaphragm 30 in the axial direction. The second orifice 302 is provided at a radial direction substantially middle position between the center and an outer peripheral edge of the diaphragm 30. The second orifice 302 is positioned at an outer peripheral side with respect to the first orifice 301, and is arranged parallel to the first orifice 301. A diameter of the second orifice 302 is set to be slightly smaller than that of the first orifice 301. The valve body 320 is provided between the first orifice 301 and the second orifice 302 in the upstream side chamber A1. In other words, the second orifice 302 is provided at a position that is separate from the first orifice 301 by the valve body 320. An X-axis negative direction end portion of the first orifice 301 opens toward the inner peripheral side space a1 of the valve body 320 in the upstream side chamber A1, while an X-axis positive direction end portion of the first orifice 301 opens toward an inner peripheral side space of the spring element 31 in the downstream side chamber A2. An X-axis negative direction end portion of the second orifice 302 opens toward the outer peripheral side space a2 of the valve body 320 in the upstream side chamber A1, while an X-axis positive direction end portion of the second orifice 302 opens toward the inner peripheral side space of the spring element 31 in the downstream side chamber A2.

Operation of Embodiment 1

Figure 3:
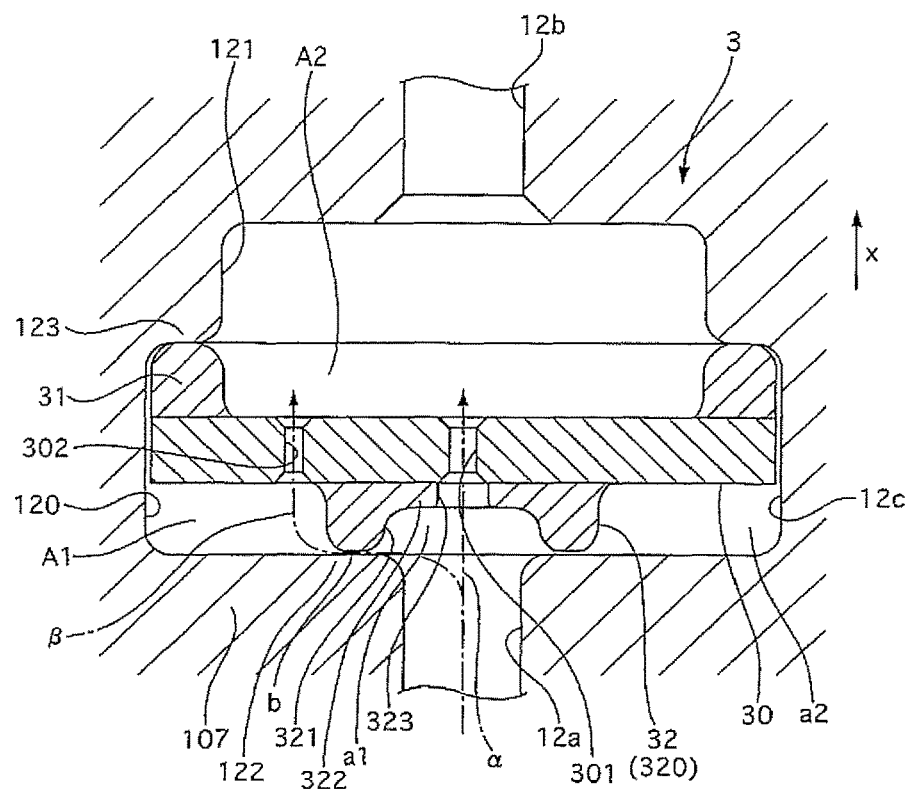
FIG. 3 is a sectional view in the axial direction of the pulsation reduction unit of the embodiment 1, which shows a flow of brake fluid when a relief mechanism is open.

Next, operation of the pump device 1 will be explained. FIG. 3 shows a sectional view in the axial direction of the pulsation reduction unit 3 in a state in which the relief mechanism 32 opens. A flow of the brake fluid is shown by a chain line. The first orifice 301 is provided on the discharge oil passage of the pump 2 (in the space 12c), and the brake fluid discharged from the pump 2 passes through the first orifice 301. More specifically, the brake fluid discharged from the pump 2 flows in the discharge oil passage in order of "the pump side pipe 12a→the upstream side chamber A1 (the space a1) (→the axial direction penetration hole 323 of the valve body 320)→the first orifice 301→the downstream side chamber A2, the wheel side pipe 12b". In the following description, this oil passage is called an oil passage α. The first orifice 301 forms, as a fixed orifice (a first fixed orifice), an aperture part of the oil passage α (the discharge oil passage). In the following description, a flow amount (a discharge flow amount) of the brake fluid discharged from the pump 2 and flowing through the pulsation reduction unit 3 is called Q, and a pressure difference between the upstream side (the X-axis negative direction side) and the downstream side (the X-axis positive direction side) of the diaphragm 30 is called ΔP. In a state in which the flow amount Q is small and there is not much pressure difference ΔP, the valve body 320 touches the wall portion 122 and the relief mechanism 32 closes, then an oil passage to the first orifice 301 (i.e. the space a1) and an oil passage to the second orifice 302 (i.e. the space a2) are partitioned or isolated from each other in the space 12c. As a pressure on the pump discharge side (on the upstream side of the diaphragm 30) becomes higher and the flow amount Q of the brake fluid passing through the first orifice 301 (the oil passage α) increases, the pressure difference ΔP between an upstream side and a downstream side of the first orifice 301 (a pressure difference between front and rear of the first orifice 301) becomes greater. This pressure difference generates a force that forces the diaphragm 30 in the X-axis positive direction.

When the flow amount Q becomes greater than a predetermined flow amount Q1, an energizing force by the pressure difference ΔP exceeds the energizing force by the spring element 31. Then, the spring element 31 is compressed and the diaphragm 30 moves to the X-axis positive direction side. The diaphragm 30 moves to a position at which the energizing force by the pressure difference ΔP and the energizing force by the spring element 31 are balanced. With this working, the valve body 320 separates from the wall portion 122 and the relief mechanism 32 opens, then the oil passage to the first orifice 301 (i.e. the space a1) and the oil passage to the second orifice 302 (i.e. the space a2) are connected to each other in the space 12c. The brake fluid that leaks from a seal gap (the oil passage b) of the valve body 320 is supplied to the space a2. The brake fluid discharged from the pump 2 passes through not only the first orifice 301 but also the second orifice 302. In addition to the oil passage α, the brake fluid flows in the discharge oil passage in order of "the pump side pipe 12a→the oil passage b→the upstream side chamber A1 (the space a2)→the second orifice 302→the downstream side chamber A2→the wheel side pipe 12b". In the following description, this oil passage is called an oil passage β. The second orifice 302 is a fixed orifice (a second fixed orifice) that allows the pass of the brake fluid when the flow amount Q becomes greater than the predetermined flow amount Q1 as described above, and forms an aperture part of the oil passage β. The orifice 300 has a variable orifice (a variable aperture) structure that changes a flow passage area (a flow passage cross-sectional area) of the orifice 300 according to the discharge flow amount Q by combining a plurality of fixed orifices (the first and second orifices 301 and 302) as described above.

Figure 4:
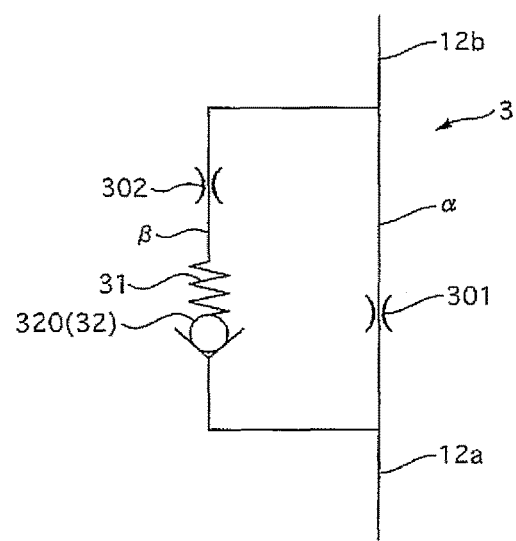
FIG. 4 is a drawing of a hydraulic circuit of the pulsation reduction unit of the embodiment 1.

FIG. 4 is a drawing that shows, as a hydraulic circuit, a function of the pulsation reduction unit 3. The pulsation reduction unit 3 is equivalent in function to a hydraulic circuit where the relief mechanism 32 (the oil passage β) is provided parallel to the first orifice 301 (the oil passage α) and the relief mechanism 32 and the second orifice 302 are provided in series (the second orifice 302 is provided at a downstream side of the relief mechanism 32 on the oil passage β). That is, the first orifice 301 and the second orifice 302 are provided parallel to each other with respect to the flow of the brake fluid. A unit formed by the diaphragm 30, the spring element 31 and the relief mechanism 32 of the pulsation reduction unit 3 has a function of a check valve that allows only a flow of the brake fluid in a direction from the pump side pipe 12a toward the wheel side pipe 12b on the oil passage β, and forbids a brake fluid flow of the opposite direction. That is, the valve body 320 of the relief mechanism 32 opens when a hydraulic pressure of the pump side pipe 12a is a predetermined amount higher than a hydraulic pressure of the wheel side pipe 12b, and allows the flow of the brake fluid from the pump side pipe 12a (through the second orifice 302) to the wheel side pipe 12b. On the other hand, when the hydraulic pressure of the wheel side pipe 12b is higher than the hydraulic pressure of the pump side pipe 12a, since a difference (a pressure difference) between the above hydraulic pressures is applied to or acts on the diaphragm 30 in addition to the energizing force of the spring element 31, the valve body 320 is pressed against the wall portion 122 and maintains a valve closed state. Thus, a flow of the brake fluid from the wheel side pipe 12b (through the second orifice 302) to the pump side pipe 12a is suppressed.

Figure 5:
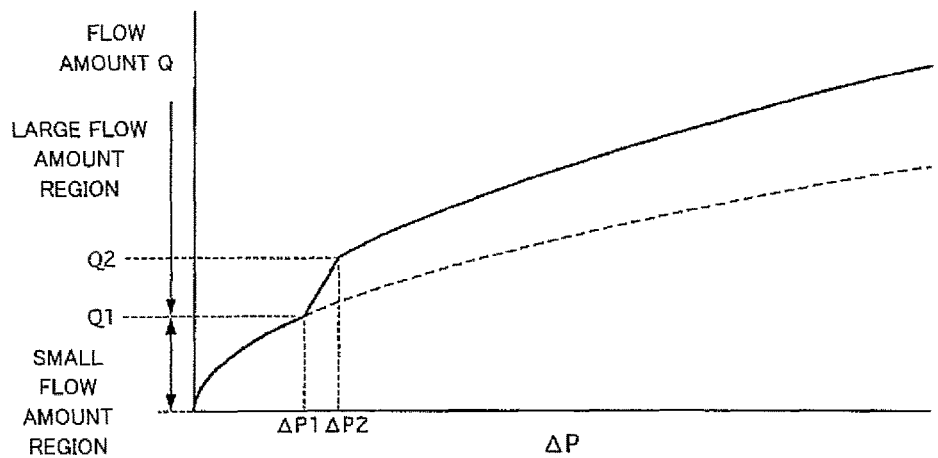
FIG. 5 shows a flow amount characteristic of the pump device of the embodiment 1.

FIG. 5 shows a flow amount characteristic of the pump device 1. A horizontal axis is the pressure difference ΔP, and a vertical axis is the flow amount Q. Here, the flow amount characteristic means a characteristic of variation of the flow amount Q with respect to the pressure difference ΔP. In a small flow amount region where the flow amount Q is equal to or less than the predetermined flow amount Q1, the brake fluid passes through only the first orifice 301, and the pressure difference ΔP (the pressure difference between front and rear of the first orifice 301) increases with increase of the flow amount Q (substantially in proportion to the square of Q). In a large flow amount region where the flow amount Q is greater than the predetermined flow amount Q1, since the brake fluid passes through not only the first orifice 301 but also the second orifice 302, the pressure difference ΔP (the pressure difference between front and rear of the first orifice 301 and the second orifice 302) increases with increase of the flow amount Q, and also as compared with the case (shown by a broken line) where the brake fluid passes through only the first orifice 301, the flow amount Q becomes great at the same pressure difference ΔP. When studying the flow amount characteristic in more detail, until the flow amount Q reaches a predetermined flow amount Q2 that is greater than the predetermined flow amount Q1 after the flow amount Q exceeds the predetermined flow amount Q1 and the spring element 31 starts to work, the brake fluid that leaks from the seal gap (the oil passage b) of the valve body 320 to the oil passage (the space a2) leading to the second orifice 302 is used not only for the oil supply to the wheel side pipe 12*b* through the second orifice 302 but also for increase of an internal pressure of the space a2. Because of this, until the flow amount Q increases from the Q1 to the Q2 (until the pressure difference ΔP increases from ΔP1 to ΔP2), a proportion or a rate (a pressure increase rate) of an increase amount of the pressure difference ΔP to an increase amount of the flow amount Q is lower than that of the case (the broken line) where the brake fluid passes through only the first orifice 301. When the flow amount Q is greater than the Q2 (when the pressure difference ΔP is greater than the ΔP2), the internal pressure of the space a2 becomes substantially equal to an internal pressure of the space a1, and the second orifice 302 starts to perform an aperture function, then the pressure increase rate becomes higher than that of the case where the flow amount Q increases from the Q1 to the Q2. In this manner, a stepped variation appears before and after the working of the spring element 31 in the flow amount characteristic.

The pulsation (pulse pressure) exists in the discharge pressure of the pump 2 (in the brake fluid discharged from the pump 2 to the pump side pipe 12*a*). By reducing the pulse pressure by the orifice 300, an operating noise (noise vibration) of the pump device 1 or the hydraulic pressure control unit 105 is suppressed, and quietness can be improved. When the flow amount Q is equal to or less than the predetermined flow amount Q1, the pulsation of the brake fluid discharged from the pump 2 and flowing through the oil passage α is attenuated and absorbed by the fact that the pulsation (the brake fluid) passes through the first orifice 301 (by the fact that the first orifice 301 is resistance to the flow). Therefore, in the small flow amount region, the pulse pressure of the discharge pressure provided to the wheel side pipe 12*b* through the oil passage α is reduced. The diameter of the first orifice 301 is set to a size which performs the aperture function and can reduce the pulse pressure at least when the flow amount Q is the predetermined flow amount Q1. With this pulse pressure reduction, during a low pump speed operation (at a time of demand for the small flow amount), the operating noise is suppressed. Here, in a situation where a demanded discharge flow amount is small (a demand brake hydraulic pressure is low), for instance, in a situation of not abrupt or hard braking but a normal braking, a degree of sensitivity of the vehicle driver to the operating noise of the brake control device (the hydraulic pressure control unit 105) is high. In this manner, by suppressing the operating noise in a situation in which low noise is required, it is possible to effectively improve the quietness (which the driver feels or senses). For instance, in a case of an electric vehicle (an electric car or a hybrid vehicle) that travels by a driving force of a motor, there often arises a situation where the pump 2 is operated at a low speed in an engine no-operating state (e.g. during execution of the regenerative brake cooperative control). In such situation, the degree of sensitivity of the vehicle driver to the operating noise of the brake control device is high. By applying the pump device 1 to such electric vehicle (to the brake control device of the electric vehicle), it is possible to effectively improve the quietness.

When the flow amount Q becomes greater than the predetermined flow amount Q1, the relief mechanism 32 opens, and the brake fluid discharged from the pump 2 flows through not only the oil passage α (the first orifice 301) but also the oil passage β (the second orifice 302). In this manner, the second orifice 302 has a function of increasing a flow passage area of the discharge oil passage according to the increase of the flow amount Q. In a situation where the demanded discharge flow amount is large (the demand brake hydraulic pressure is high) such as during a high pump speed operation (at a time of demand for the large flow amount) and it is required to rapidly or immediately increase the wheel cylinder pressure with stability (e.g. the hard braking), by increasing the flow passage area of the discharge oil passage, a required flow amount Q is immediately secured, and the stable increase of the wheel cylinder pressure can be realized. The flow amount Q1 or the pump speed (the pump rotation speed) at which the second orifice 302 starts to communicate with the passage b (at which the relief mechanism 32 opens) can be adjusted as necessary by changing a setting load of the spring element 31.

Here, from the viewpoint of the increase of the flow passage area, the second orifice 302 might not especially have the aperture function. That is, the diameter of the second orifice 302 could be set to such large size that the aperture function (a pulse pressure reduction function) is not performed, and the second orifice 302 could be set as a normal flow passage. For instance, the diameter of the second orifice 302 could be set so that the same pressure increase performance as that of a case where no orifice is provided on the discharge oil passage is achieved in the large flow amount region of the predetermined flow amount Q1 or more. In other words, the second orifice 302 could be omitted. In the embodiment 1, the pulsation of the brake fluid flowing through the oil passage β is attenuated and absorbed by the fact that the pulsation (the brake fluid) passes through the second orifice 302, then the pulse pressure of the discharge pressure provided to the wheel side pipe 12*b* through the oil passage β is reduced. That is, since the second orifice 302 has the aperture function, it is possible to increase the discharge flow amount so as to realize the stable pressure increase described above, and also to improve a pulse pressure reduction effect even during the high pump speed operation. In other words, it is possible to reduce the pulse pressure in a wide range from the small flow amount region to the large flow amount region.

During the high pump speed operation, the spring element 31 works (the diaphragm 30 moves), and the pump side pipe 12*a* communicates with the second orifice 302 through the upstream side chamber A1 (the space a2). Here, the chamber A1 (the space a2) forms the volume chamber, and serves as a damper chamber that absorbs and reduces the pulsation of the brake fluid coming from the pump side pipe 12*a*. Further, since the pressure of the chamber A1 or the pressure difference ΔP increases with increase of the flow amount Q, the spring element 31 is compressed (the diaphragm 30 moves in the X-axis positive direction), and a volume of the chamber A1 increases. That is, the chamber A1 forms the variable volume chamber. When the discharge flow amount Q of the pump 2 is greater than the predetermined flow amount Q1, the diaphragm 30 slides continually in the X-axis direction in response to or according to a hydraulic pressure variation due to the pulsation of the brake fluid, and the volume of the chamber A1 changes with a small movement. With this volume change, a part of the pulsation is absorbed and reduced. Thus, a pulsation reduction effect as the damper chamber by the chamber A1 is improved. In other words, it is possible to reduce the pulse pressure in a wide range from the small flow amount region to the large flow amount region. Here, the downstream side chamber A2 and/or the second space 121 form the volume chamber, and serve as the damper chamber that further absorbs and reduces the pulse pressure of the brake fluid discharged through the orifice 300 irrespective of magnitude of the flow amount Q.

In the following description, working and effect of the pump device 1 will be explained as compared with the technique of the related art.

In the related art, there is known a pump device having an aperture portion on a discharge oil passage of the pump and reducing a discharge pulse pressure by changing a flow passage resistance (an aperture resistance) of the aperture portion according to a magnitude of the discharge flow amount from the pump. For instance, in a pump device disclosed in the Patent Document 1 (hereinafter called a related art 1), an aperture is provided at a piston member provided on the discharge oil passage, and a tapered protrusion is set so as to penetrate this aperture, then the aperture portion is formed by a ring-shaped gap formed between an outer periphery of this protrusion and an internal diameter portion of the aperture. The piston member moves according to the discharge flow amount, and an area (an effective diameter) of the aperture portion increases/decreases with the movement of the piston member, then a variable aperture according to the discharge flow amount is formed.

However, in the related art pump device including the related art 1, the aperture portion is provided with the aim of only reducing the pulse pressure. Therefore, since the aperture portion becomes a resistance, in a case where a large discharge flow amount is required of the pump, there is a risk of not immediately securing the required flow amount. In order to secure the large flow amount, for instance, it is conceivable that an output of a motor that drives the pump will be increased. However, in this case, a size of the device might be increased and electric power consumption could be high. In contrast to this, the pump device 1 of the embodiment 1 has the first orifice 301 with the aim of reducing the pulse pressure and also has the second orifice 302 with the aim of securing the discharge flow amount. Also, when the discharge flow amount Q becomes greater than the predetermined flow amount Q1, the brake fluid passes through the second orifice 302. Thus, when the large discharge flow amount is required, by the fact that the flow passage area increases by an area of the second orifice 302, the orifice 300 is prevented from serving as the resistance, then the required flow amount Q can be immediately secured. With this working, the pressure increase performance of the pump 2 can be increased. From this viewpoint, it is preferable to set the flow passage area (an effective diameter) of the second orifice 302 to a size that can suppress or reduce the flow passage resistance (of the orifice 300) and obtain a desired pressure increase performance even when the required discharge flow amount is greater than the predetermined flow amount Q1.

Further, the related art 1 has a structure in which the aperture portion is formed by the ring-shaped gap formed between the protrusion and the aperture, and the protrusion and the aperture relatively move according to the discharge flow amount, then the area (the flow passage resistance) of the aperture portion is increased/decreased. For this reason, the structure is complex, and the cost might increase. In contrast to this, in the pump device 1 of the embodiment 1, the flow passage areas of the orifice are not separately changed, but the flow passage area is changed by combining the first orifice 301 and the second orifice 302 which are the fixed orifices. Therefore, since there is no need to employ the structure like the related art 1 to separately change the flow passage areas (the flow passage resistances) of the orifice, the structure of the pump device 1 of the embodiment 1 can be simplified, and the cost can be reduced.

Figure 6A:
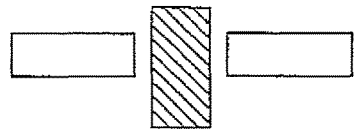
FIGS. 6A to 6C are schematic drawings of an aperture portion of a related art 1.
Figure 6B:
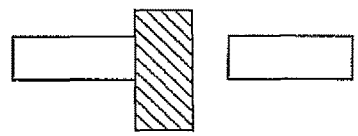
Figure 6C:
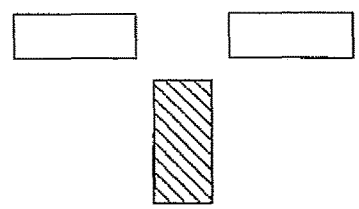
Figure 7:
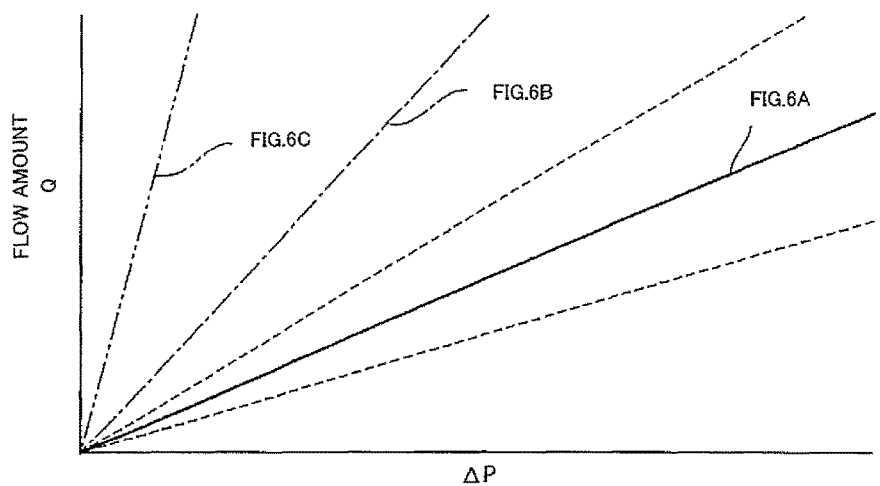
FIG. 7 shows a flow amount characteristic of a pump device of the related art 1.
Figure 8:
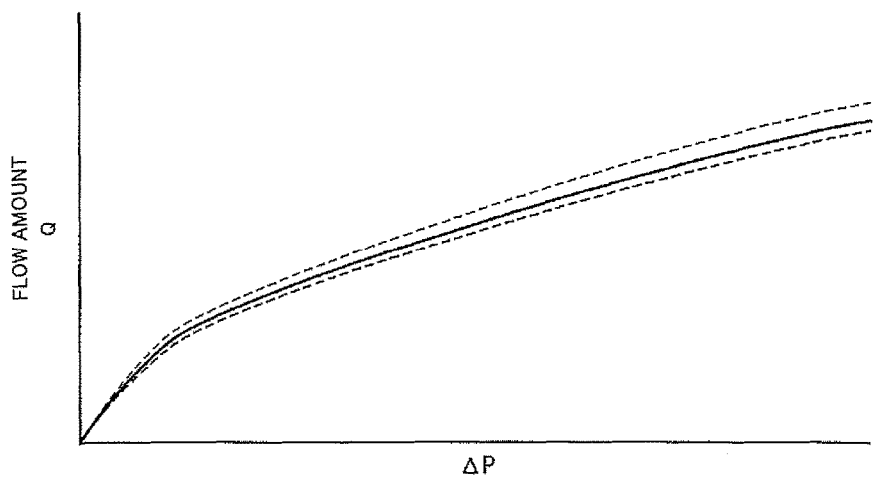
FIG. 8 shows a flow amount characteristic of a pump device of a comparative example.

Moreover, since the related art 1 employs the above structure, for instance, when the pump discharge flow amount is relatively small or at a low temperature operation, a variation of the flow passage resistance of the aperture portion becomes great, then there is a risk of not obtaining a stable discharge performance and a stable pulse pressure reduction effect. FIGS. 6A to 6C schematically show the aperture portion of the related art 1. FIG. 7 shows a flow amount characteristic of the related art 1. In the related art 1, in a case where a position of the protrusion with respect to the aperture shifts in a radial direction, variation in a shape of the ring-shaped gap occurs, which brings about an occurrence of variation in the flow amount characteristic among the pump devices. In a case where the protrusion fully shifts (FIG. 6B, a chain line in FIG. 7), the flow amount Q at the same pressure difference ΔP is almost 2.5 times as large as an ideal case where no shift occurs (FIG. 6A, a solid line in FIG. 7), and the flow amount characteristic widely shifts or separates toward a case where the protrusion is not set to the aperture (FIG. 6C, a two-dot chain line in FIG. 7). In addition, an influence of tolerance on the flow amount characteristic is great in the related art 1. Even if the tolerance is the same level as that of the fixed orifice, as shown by the broken line in FIG. 7, a degree of the variation by the tolerance with respect to the ideal case where no shift occurs (the solid line in FIG. 7) is great. FIG. 8 shows a flow amount characteristic of a comparative example in which only one fixed orifice is provided on the discharge oil passage. In the case of the comparative example, a degree of the variation in the flow amount characteristic of the case (a broken line) where the variation by the tolerance occurs with respect to an ideal case (a solid line) where the fixed orifice has no size variation is small. In contrast to this, in the case of the related art 1, even if the tolerance is the same as that of the comparative example, the variation in the flow amount characteristic (the broken line in FIG. 7) is greater than that of the comparative example. Hence, the related art 1 might not obtain the desired performance and effect.

In contrast to this, in the pump device 1 of the embodiment 1, the first orifice 301 and the second orifice 302 are the fixed orifices. By the fact that the number of the fixed orifice through which the brake fluid passes increases when the discharge flow amount exceeds the predetermined discharge flow amount Q1, the flow passage area (of the first and second orifices 301 and 302 as a whole) increases. Since the variable aperture is realized by combining the plurality of fixed orifices in this manner, the problem like the related art 1 does not arise, and the variation in the flow amount characteristic is small. In other words, not by changing the flow passage area (the flow passage resistance) of each orifice, but by setting the plurality of fixed orifices 301 and 302 parallel to each other and changing the presence or absence of the communication (connection) of each of the orifices 301 and 302 (changing the number of communication (connection) of each of the orifices 301 and 302) without changing the flow passage area (the effective diameter) of each of the orifices 301 and 302, the flow passage area of the orifice 300 as a whole is changed. Accordingly, variations (variations in the variation of the flow passage resistance) when changing the flow passage area are small among the pump devices 1, and the variation in the flow amount characteristic is suppressed or reduced, then the stable discharge performance and the stable pulse pressure reduction effect can be obtained. For instance, the variation by the tolerance of the flow amount characteristic (FIG. 5) of the embodiment 1 stays within a small variation range like the comparative example not only in the small flow amount region but in the large flow amount region as well.

In the embodiment 1, the pulsation reduction unit 3 is provided at the downstream side of the check valve 4. However, the check valve 4 could be provided at the downstream side of the pulsation reduction unit 3. Here, the flow of the brake fluid which passes through the orifice and whose pulsation is reduced could include a turbulent flow. Thus, in the case where the check valve 4 is provided at the downstream side of the pulsation reduction unit 3 (the orifice 300), a valve body (a ball) of the check valve 4 might vibrate in a direction perpendicular to the direction of the pipe 12 (i.e. in a lateral direction) due to the turbulent flow, and there is a risk of generating an unusual or abnormal noise (a whistle sound). In contrast to this, in the embodiment 1, since the pulsation reduction unit 3 is provided at the downstream side of the check valve 4, the flow of the brake fluid passing through the check valve 4 becomes a laminar flow (including the pulsation) before passing through the orifice 300. Therefore, it is possible to suppress the generation of the above noise, and to effectively suppress the operating noise of the pump device 1.

In the embodiment 1, the relief mechanism 32 that switches open/close of the oil passage β is provided, and when the flow amount Q becomes greater than the predetermined flow amount Q1, the valve body 320 opens then the passage β is opened (the flow of the brake fluid to the second orifice 302 is allowed). However, the passage β could be opened even when the flow amount Q is less than or equal to the predetermined flow amount Q1 (see an embodiment 3). In the embodiment 1, since the relief mechanism 32 (the valve body 320) is provided, only the oil passage α can be the oil passage with the passage β closed (the brake fluid can pass through only the first orifice 301) in the small flow amount region, thereby surely obtaining the pulse pressure reduction effect (a noise suppression effect) in the small flow amount region.

The pulsation reduction unit 3 of the embodiment 1 has the diaphragm 30 that divides or partitions the space 12c provided on the discharge oil passage into two chambers at the upstream side and the downstream side, and the first orifice 301 and the second orifice 302 are formed at the diaphragm 30. Thus, in order to form the oil passages α and β parallel to each other and in order to form the first and second orifices 301 and 302 parallel to each other, only providing the space 12c on the discharge oil passage is required without requiring a complex or sophisticated processing of an inside of the housing 107. Thus, the processing can be simplified. Further, since the first and second orifices 301 and 302 are formed by penetrating the diaphragm 30, a processing accuracy of the first and second orifices 301 and 302 can be improved. Furthermore, the valve body 320 separating or partitioning the oil passage to the first orifice 301 (i.e. the space a1) and the oil passage to the second orifice 302 (i.e. the space a2) in the space 12c and the spring element 31 elastically supporting the diaphragm 30 in the space 12c are provided. Since the first and second orifices 301 and 302 and the relief mechanism 32 are formed as an integral unit by the diaphragm 30, the spring element 31 and the valve body 320 in this manner, parts count for forming the pulsation reduction unit 3 is reduced, and the structure or configuration of the pulsation reduction unit 3 can be simplified. Here, as long as the spring element 31 and the valve body 320 are placed between the wall portions 122, 123 of the space 12c and the diaphragm 30, the spring element 31 and the valve body 320 are not necessarily formed integrally with the diaphragm 30. In the embodiment 1, since the spring element 31 and the valve body 320 are formed integrally with the diaphragm 30, these components can be treated as one unit, and an assembly performance can be improved.

Moreover, the space 12c and the diaphragm 30 have each an arbitrary shape. In the embodiment 1, the space 12c has the ring-shaped space (or the doughnut-shaped space), and the diaphragm 30 also has the ring shape (the disc shape). Therefore, a sliding resistance between the outer periphery of the diaphragm 30 and an inner peripheral wall of the space 12c can easily be substantially uniform in a circumferential direction. In addition, the discharge oil passage (the pipe 12) is set at the position including the center of the ring-shaped space 12c. Therefore, distribution of the pressure acting on the diaphragm 30 from the discharge oil passage can be substantially uniform, thereby readily achieving a smooth and stable movement of the diaphragm 30. The spring element 31 also has an arbitrary shape. In the embodiment 1, since the spring element 31 is formed into the ring shape which is the same as the shape of the diaphragm 30, a spring force that forces the diaphragm 30 is substantially uniform in the circumferential direction, thereby readily achieving the smooth and stable movement of the diaphragm 30. Further, the valve body 320 also has an arbitrary shape. In the embodiment 1, since the valve body 320 is formed into the ring shape, and by combination with the ring-shaped spring element 31, the valve body 320 is seated on the valve seat (the periphery of the opening of the pump side pipe 12a at the wall portion 122) with a substantially uniform force in the circumferential direction. This can improve the sealing performance of the valve body 320.

The discharge oil passage (the pipe 12) is set at the position including the center of the ring-shaped space 12c, the second orifice 302 is positioned at the outer peripheral side with respect to the first orifice 301, and the valve body 320 is a ring-shaped member provided between the first orifice 301 and the second orifice 302. Therefore, the configuration of the hydraulic circuit of FIG. 4, i.e. the configuration of the circuit where the first orifice 301 and the second orifice 302 are provided parallel to each other, the first orifice 301 is always opened (the first orifice 301 communicates with the wheel side pipe 12b all the time), and the open/close of the second orifice 302 can be switched by the valve body 320, can be simply realized (by a simple structure). Further, by setting the valve body 320 between the upstream side wall portion 122 of the ring-shaped space 12c and the diaphragm 30, and also by setting the spring element 31 (that is a compression spring) between the downstream side wall portion 123 of the ring-shaped space 12c and the diaphragm 30, the configuration in which the valve body 320 opens when the flow amount Q becomes greater than the predetermined flow amount Q1 then the second orifice 302 is opened can be simply realized.

Effect of Embodiment 1

In the following description, effects produced by the pump device 1 of the embodiment 1 will be explained.

(A1) The pump device has the pulsation reduction unit 3 which reduces pulsation of brake fluid discharged from the pump 2. The pulsation reduction unit 3 has the first orifice 301 which is provided on the discharge oil passage (the pipe 12) of the pump 2, and through which the brake fluid discharged from the pump 2 passes; and the second orifice 302 which is provided parallel to the first orifice 301, and through which, when the flow amount Q of the discharged brake fluid becomes greater than the predetermined flow amount Q1, the brake fluid passes.

Therefore, in the small flow amount region where the flow amount Q is equal to or less than the predetermined flow amount Q1, the pulse pressure is reduced by the first orifice 301, then the quietness can be improved. Further, in the large flow amount region where the flow amount Q is greater than the predetermined flow amount Q1, the flow passage area is increased by the second orifice 302 and the pressure increase performance is improved, thereby improving the discharge performance.

(A2) The pump 2 has the delivery valve (the check valve 4) that allows only the flow of the brake fluid in the discharge direction of the pump 2, and the pulsation reduction unit 3 is provided at the downstream side of the delivery valve 4.

Therefore, generation of an unusual or abnormal noise at the delivery valve (the check valve 4) is suppressed, and the quietness can be improved.

(A3) The first orifice 301 and the second orifice 302 are the fixed orifices.

Thus, variation in the flow amount characteristic is suppressed, and the stable discharge performance and the stable pulse pressure reduction effect can be obtained.

(A4) The pulsation reduction unit 3 has, between the first orifice 301 and the second orifice 302, the valve body 320 that opens and allows the flow of the brake fluid to the second orifice 302 when the flow amount Q of the discharged brake fluid is greater than the predetermined flow amount Q1.

Thus, in the small flow amount region, the brake fluid passes through only the first orifice 301, thereby surely obtaining the pulse pressure reduction effect.

(A5) The pulsation reduction unit 3 has the diaphragm 30 which is provided in the space 12c provided on the discharge oil passage (the pipe 12) and divides the space 12c into two chambers A1, A2 at the upstream side and the downstream side; and the spring element 31 which elastically supports the diaphragm 30 in the space 12c. The first orifice 301 and the second orifice 302 are formed by penetrating the diaphragm 30. The valve body 320 by which the oil passage (the space a1) leading to the first orifice 301 and the oil passage (the space a2) leading to the second orifice 302 are separated in the space 12c is provided. When the flow amount Q becomes greater than the predetermined flow amount Q1, the valve body 320 allows the flow of the brake fluid from the discharge oil passage (the pump side pipe 12a) to the second orifice 302.

Therefore, the advantage of simplifying the configuration of the pulsation reduction unit 3 can be obtained.

Embodiment 2

Figure 9:
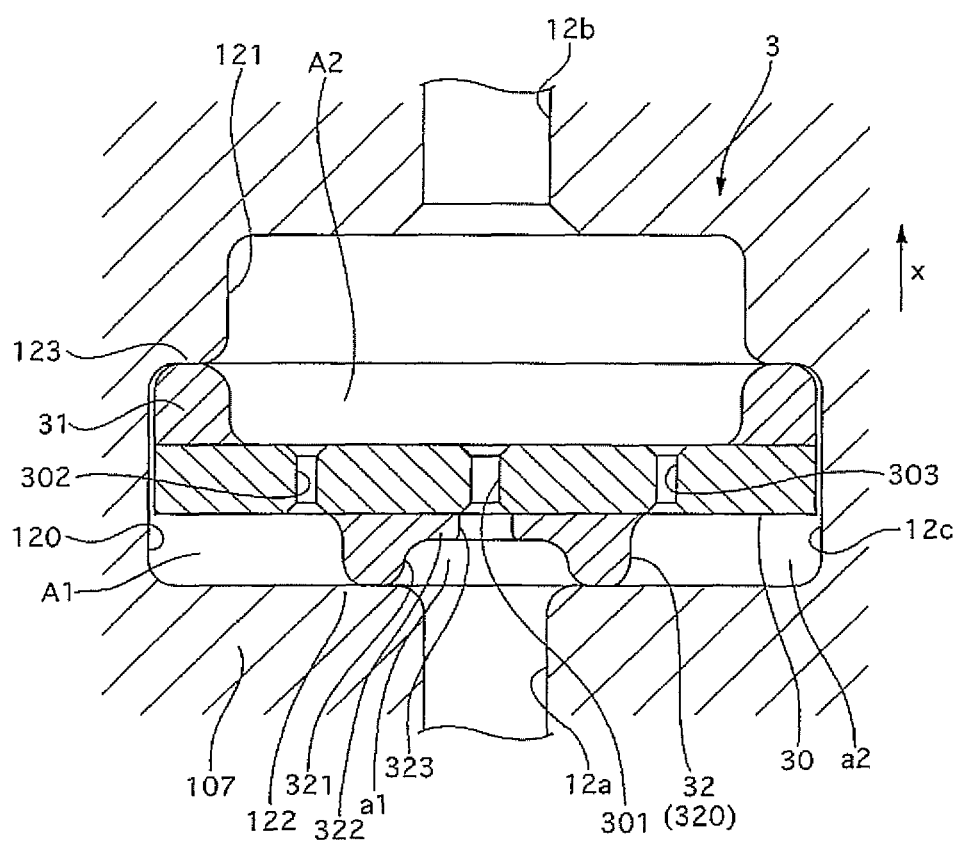
FIG. 9 is a sectional view in an axial direction of a pulsation reduction unit of an embodiment 2.

A pump device 1 of an embodiment 2 is different from the embodiment 1 in a structure in which the pulsation reduction unit 3 has a third orifice 303. First, its configuration (or structure) will be explained. FIG. 9 is a sectional view in the axial direction of the pulsation reduction unit 3 of the embodiment 2. The orifice 300 has the first and second orifices 301 and 302 and the third orifice 303. The third orifice 303 is provided at a radial direction substantially middle position between the center and the outer peripheral edge of the diaphragm 30 and at an opposite side to the second orifice 302 with respect to the first orifice 301. The third orifice 303 is formed by penetrating the diaphragm 30 in the axial direction. The third orifice 303 is provided at a position that is separate from the first orifice 301 by the valve body 320. The third orifice 303 has substantially the same diameter as that of the second orifice 302. Other components and structures are the same as those of the embodiment 1. Therefore, they are indicated by the same reference signs as those of the embodiment 1, and their explanations are omitted here.

Figure 10:
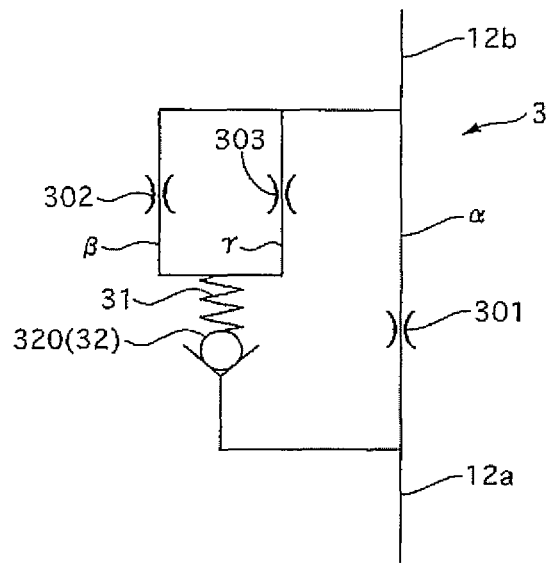
FIG. 10 is a drawing of a hydraulic circuit of the pulsation reduction unit of the embodiment 2 (two second orifices are provided).

Next, working of the pump device 1 will be explained. When the flow amount Q becomes greater than the predetermined flow amount Q1, the mechanism 32 opens, and the brake fluid that leaks from the seal gap (the oil passage b, see FIG. 3) of the valve body 320 to the space a2 passes through not only the second orifice 302 but also the third orifice 303 and is supplied to the downstream side chamber A2 (the wheel side pipe 12b). In the flowing description, an oil flow passage through the third orifice 303 is called an oil passage Y. FIG. 10 is a drawing that shows, as a hydraulic circuit, the above function of the pulsation reduction unit 3 of the embodiment 2. The third orifice 303 (the oil passage Y) is provided parallel to the second orifice 302 (the oil passage β). In other words, a plurality of the second orifices 302 (two second orifices 302) are provided.

Figure 12:
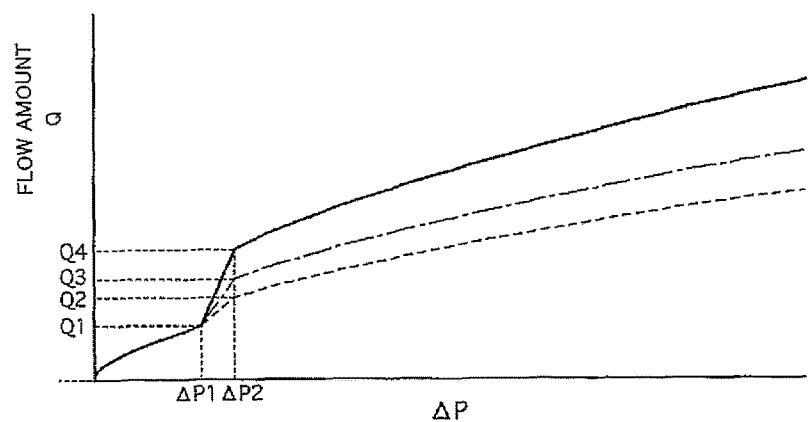
FIG. 12 shows a flow amount characteristic of a pump device of the embodiment 2.

FIG. 12 shows a flow amount characteristic that is similar to FIG. 5. The characteristic of the embodiment 2 is indicated by a chain line. For the comparison, the characteristic of the embodiment 1 is indicated by a broken line. In the small flow amount region where the flow amount Q is equal to or less than the predetermined flow amount Q1, the brake fluid passes through only the first orifice 301. In the large flow amount region where the flow amount Q is greater than the predetermined flow amount Q1, the brake fluid passes through not only the first orifice 301 but also the second and third orifices 302 and 303. More specifically, until the flow amount Q reaches a flow amount Q3 (that is greater than the Q2 of the embodiment 1) from the Q1 (until the pressure difference ΔP reaches ΔP2 from ΔP1), the brake fluid that leaks from the seal gap (the oil passage b) of the valve body 320 to the space a2 is used not only for the increase of the internal pressure of the space a2 but also for the oil supply to the wheel side pipe 12b through the second and third orifices 302 and 303. Thus, the pressure increase rate is lower than that of the embodiment 1 (the broken line). When the flow amount Q is greater than the flow amount Q3, the internal pressure of the space a2 becomes substantially equal to the internal pressure of the space a1, and the second and third orifices 302 and 303 start to perform the aperture function, then the pressure increase rate becomes higher than that of the case where the flow amount Q increases from the Q1 to the Q3. In the large flow amount region, as compared with the case (the broken line) where the brake fluid passes through only the first and second orifices 301 and 302 (the oil passages α and β), the flow amount Q at the same pressure difference ΔP is large by an amount of the brake fluid that passes through the third orifice 303 (the oil passage Y). As explained above, in the same manner as the second orifice 302, the third orifice 303 has the function of allowing the pass of the brake fluid and increasing the flow passage area of the discharge oil passage according to the increase of the flow amount Q. In the large flow amount region, by the fact that, in addition to the first orifice 301, the pass of the brake fluid through the plurality of orifices 302 and 303 is allowed, it is possible to meet an even larger required flow amount, thereby improving the discharge performance of the pump 2. The other working or operation and effect are the same as those of the embodiment 1.

Here, a diameter (a flow passage area) of the third orifice 303 can be set as necessary. Further, a circumferential direction position and a radial direction position of the third orifice 303 are not limited to those of the embodiment 2. For instance, the third orifice 303 could be formed at an outer peripheral side with respect to the second orifice 302. In the embodiment 2, since the second and third orifices 302 and 303 are arranged so as to be substantially symmetrical about the axial center of the diaphragm 30, distribution of the pressure acting on the diaphragm 30 can be substantially uniform, thereby achieving the smooth and stable movement of the diaphragm 30.

Furthermore, unlike the second orifice 302, the third orifice 303 could be provided so that when the flow amount Q becomes a second predetermined flow amount Q that is greater than the predetermined flow amount Q1, the brake fluid passes through the third orifice 303. For instance, in the hydraulic circuit of FIG. 10, between the relief mechanism 32 (the valve body 320) and the third orifice 303 on the oil passage Y, a new relief mechanism (a new valve body) that opens when the flow amount Q becomes greater than the Q could be added. In this case, the flow amount characteristic having a stepped portion (at a time of orifice open) changes to the flow amount characteristic having multi-stepped portions, then a smooth flow amount characteristic (i.e. a smooth pressure increase characteristic of the pump 2) can be obtained.

Figure 11:
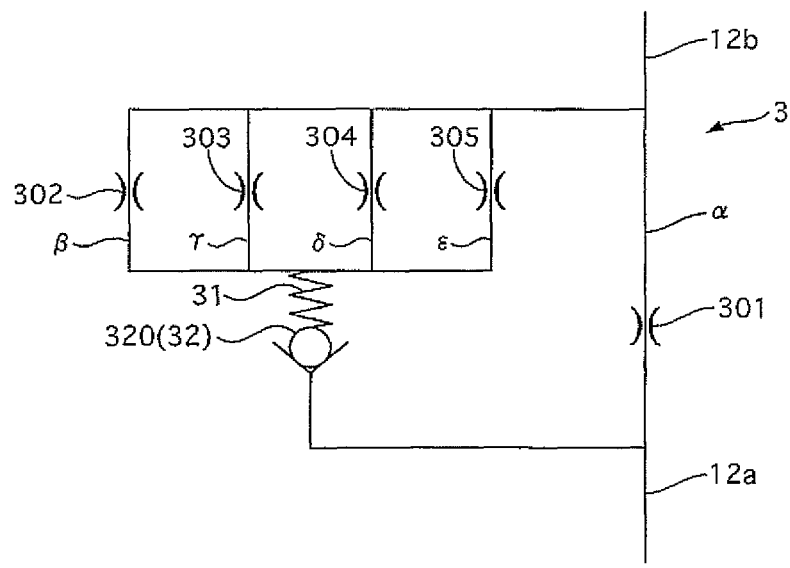
FIG. 11 is a drawing of a hydraulic circuit of the pulsation reduction unit of the embodiment 2 (three second orifices or more are provided).

Moreover, as shown in a drawing of a hydraulic circuit of FIG. 11, not only the third orifice 303 (the oil passage Y), but also a fourth orifice 304 (an oil passage δ) and a fifth orifice 305 (an oil passage ε) could be provided parallel to the second orifice 302 (the oil passage β). In other words, the number of the second orifice that is provided parallel to the first orifice 301 is not limited to two like the embodiment 2, but the number of the second orifice could be an arbitrary number (n=3, 4, 5 . . . ) that is 3 or more. In this case, since the flow passage area of the discharge oil passage in the large flow amount region increases by an amount equivalent to the number of the added orifices, as shown by a solid line in the characteristic in FIG. 12, the flow amount Q in the large flow amount region can be further increased, and it is possible to meet a still larger required flow amount.

Embodiment 3

Figure 13:
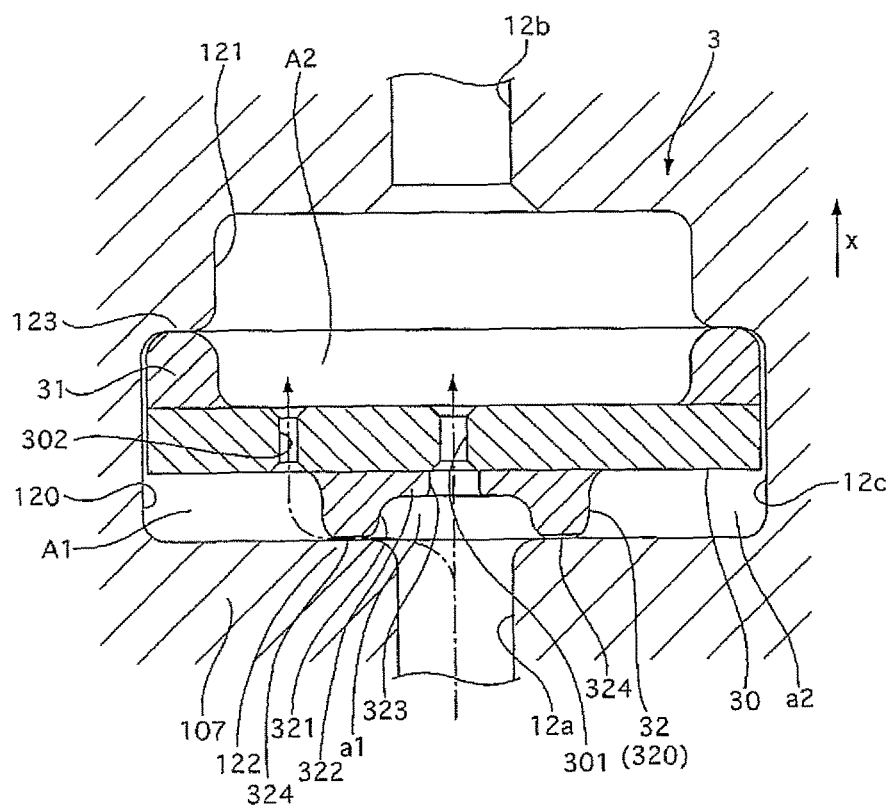
FIG. 13 is a sectional view in an axial direction of a pulsation reduction unit of an embodiment 3.
Figure 14:
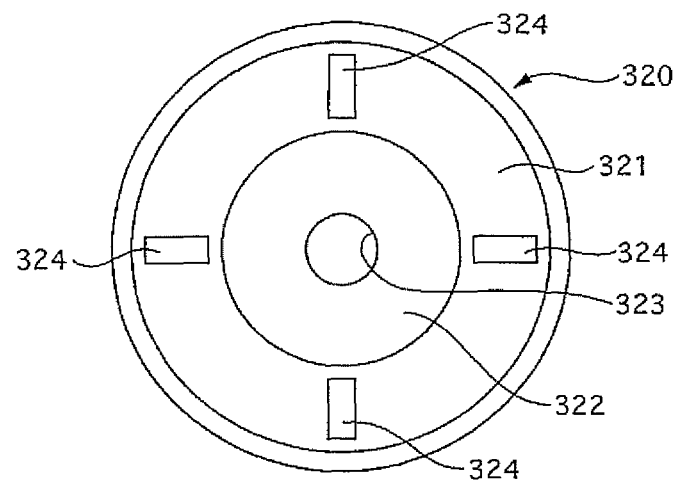
FIG. 14 is a front view in an axial direction of a valve body of the pulsation reduction unit of the embodiment 3.

A pump device 1 of an embodiment 3 is different from the embodiment 1 in a structure in which a communication passage that connects an inner side and an outer side of the valve body 320 is formed. First, its configuration will be explained. FIG. 13 is a sectional view in an axial direction of the pulsation reduction unit 3 of the embodiment 3. FIG. 14 is a front view of the valve body 320 viewed from the X-axis negative direction side. A plurality of slits (four slits in the embodiment 3) 324 are formed at the X-axis negative direction end portion (a top portion) of the bulging surface of the valve body 320 (the cylindrical portion 321). The slit 324 is a groove or a hollow portion (a cutting portion) formed on a surface of the cylindrical portion 321 so as to extend in the radial direction from an inner peripheral side toward an outer peripheral side of the valve body 320. As shown in FIG. 13, in a state in which the X-axis negative direction end portion (except a part where the slit 324 is provided) of the valve body 320 (the cylindrical portion 321) touches the wall portion 122, a certain gap is formed between a bottom of the slit 324 and the wall portion 122. By this gap, the communication passage always connecting the inner peripheral side (the space a1) and the outer peripheral side (the space a2) of the valve body 320 is formed (by the number of the slits 324). Other components and structures are the same as those of the embodiment 1. Therefore, they are indicated by the same reference signs as those of the embodiment 1, and their explanations are omitted here.

Figure 15:
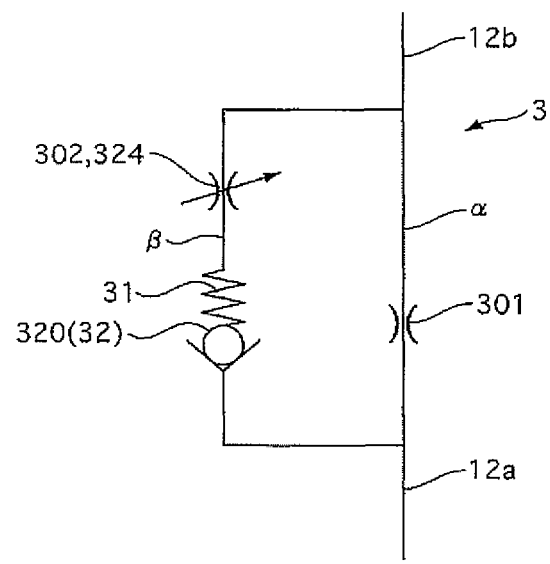
FIG. 15 is a drawing of a hydraulic circuit of the pulsation reduction unit of the embodiment 3.

Next, working of the pump device 1 will be explained. Irrespective of the magnitude of the flow amount Q, i.e. before the relief mechanism 32 opens, the brake fluid supplied from the pump side pipe 12a to the inner peripheral side (the space a1) of the valve body 320 is discharged to the wheel side pipe 12b through the first orifice 301 as shown by a chain line in FIG. 13, and also leaks to the outer peripheral side (the space a2) of the valve body 320 through the slit 324 and is supplied to the wheel side pipe 12b through the second orifice 302. A flow passage of the brake fluid leading from the pump side pipe 12a to the wheel side pipe 12b through the slit 324 and the space a2 is narrowed by the slit 324 before the relief mechanism 32 opens, and is narrowed by the second orifice 302 after the relief mechanism 32 opens. FIG. 15 is a drawing that shows, as a hydraulic circuit, the above function of the pulsation reduction unit 3 of the embodiment 3. The first orifice 301 is the fixed orifice. On the other hand, the second orifice 302 (including the slit 324) is functionally equivalent to a variable orifice that changes the flow passage area (the flow amount Q) according to the open/close of the relief mechanism 32.

Figure 16:
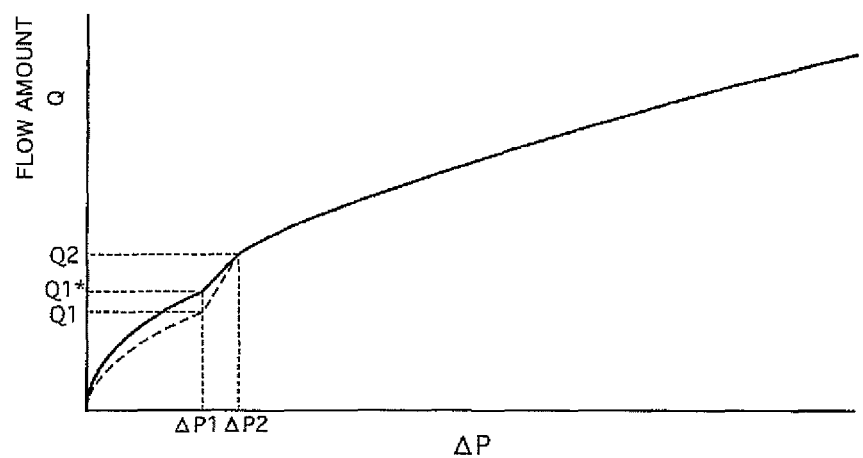
FIG. 16 shows a flow amount characteristic of a pump device of the embodiment 3.

FIG. 16 shows a flow amount characteristic that is similar to FIG. 5. The characteristic of the embodiment 3 is indicated by a solid line. For the comparison, the characteristic of the embodiment 1 is indicated by a broken line. Until the pressure difference ΔP increases to ΔP1, i.e. from a not-yet-open state of the relief mechanism 32, the flow amount (the brake fluid) that leaks through the slit 324 passes through the second orifice 302. Therefore, until the pressure difference ΔP increases to ΔP1, a proportion or a rate of an increase amount of the flow amount Q to an increase amount of the pressure difference ΔP is higher than that of the embodiment 1. The flow amount Q when the pressure difference ΔP reaches ΔP1 is Q1* that is greater than the embodiment 1 (Q1). Further, until the pressure difference ΔP increases to ΔP2 from ΔP1 (the flow amount Q increases to Q2 from Q1*) and the second orifice 302 starts to perform the aperture function after the relief mechanism 32 opens, the rate of the increase amount of the flow amount Q to the increase amount of the pressure difference ΔP is lower than that of the embodiment 1. Thus, the stepped variation in the flow amount characteristic at the working of the spring element 31 (before and after the open of the relief mechanism 32) is suppressed, and the flow amount characteristic becomes smooth. It is therefore possible to realize the smooth pressure increase characteristic of the pump and to achieve a stable pressure increase of the wheel cylinder pressure. The other working or operation and effect are the same as those of the embodiment 1.

A flow passage area (an effective diameter) of the slit 324 is set to, e.g. a size which performs the aperture function and can reduce the pulse pressure at least when the flow amount Q is the Q1*. With this pulse pressure reduction, during the low pump speed operation (at the time of demand for the small flow amount), the noise can be surely suppressed. Here, the flow passage area of the slit 324 could be set to a size which performs the aperture function and can reduce the pulse pressure at least when the flow amount Q is the predetermined flow amount Q1, and the flow passage area of the slit 324 is not especially limited. Further, a shape of the slit 324 and the number of the slit 324 can be changed as necessary. For instance, instead of the communication passage formed by providing the slit on the surface of the valve body 320, the communication passage could be formed by providing a hole that penetrates an inside of the valve body 320. Moreover, the first orifice 301 might be omitted, then the slit 324 has a function of the first orifice 301.

Other Embodiment

Although the present invention has been explained by reference to the certain embodiments described above, the configuration or structure of the present invention is not limited to the embodiments described above. Modifications and variations of the embodiments described above can be possible as the present invention.

For instance, the pump device 1 could be applied to a system or a device except the brake control device.

Further, the configuration of the hydraulic circuit of the hydraulic pressure control unit 105 or the control method is not limited to that of the embodiment 1. For instance, instead of the reservoir 8 having the check valve function, a normally-closed gate-in valve and a check valve could be provided between the master cylinder 103 and the pump 2 on the pipe 11.

In the embodiments, the pulsation reduction unit 3 is arranged at the downstream side (the wheel cylinder 106 side) of the connecting portion between the pipe 12 and the master cylinder 103 (the connecting portion between the pipes 12 and 13) on the pipe 12 connecting the discharge portion of the pump 2 and the wheel cylinder 106. However, the pulsation reduction unit 3 could be arranged at an upstream side of the connecting portion (on the pipe 12 connecting the discharge portion of the pump 2 and the master cylinder 103). With this arrangement, vibration caused by the pulse pressure is not transmitted to the driver depressing the brake pedal 101 at the ABS control operation etc., then brake feel is improved.

As long as the pulsation reduction unit 3 is equivalent to the hydraulic circuit shown in FIG. 4, FIG. 10, FIG. 11 or FIG. 15, the configuration of the pulsation reduction unit 3 is not limited to that of the embodiment, and an arbitrary mechanical configuration can be employed. For instance, it is possible to form the above hydraulic circuit by using a structure (e.g. a structure of a pump delivery valve etc.) or a component which exists in a conventional hydraulic pressure control unit. As the valve body 320 of the relief mechanism 32, it is not limited to the rubber seal, but a spool or a ball can be possible. Further, as the spring element 31, it is not limited to the rubber spring, but a compression coil spring or a flat spring can be possible. Furthermore, in the embodiments, the orifices 301 and 302 are provided at the diaphragm 30. However, the diaphragm 30 might be omitted, then the orifices 301 and 302 are provided at other member or other body. For instance, instead of the unit formed by the diaphragm 30, the spring element 31 and the valve body 320 of the pulsation reduction unit 3, a check valve having a valve body (a ball) and a return spring (e.g. a coil spring) could be provided then the second orifice 302 is provided on a downstream side oil passage or an upstream side oil passage of the check valve.

In the following description, the invention except the invention recited in scope of claim for patent, which is understood from the embodiments above, is described together with its effect.

(A6) In the pump device of (A5), the space is the ring-shaped space. The discharge oil passage is set at the position including the center of the ring-shaped space. The diaphragm is the ring-shaped diaphragm. The spring element is the ring-shaped elastic body that is placed between the downstream side wall of the space and the diaphragm. The second orifice is set at the outer peripheral side with respect to the first orifice. The valve body is the ring-shaped member that is placed between the upstream side wall of the space and the diaphragm and positioned between the first orifice and the second orifice.

Therefore, the advantage of achieving the smooth and stable movement of the diaphragm can be obtained.

(A7) In the pump device of (A6), the ring-shaped member is provided with the communication passage that connects the inner side and the outer side of the ring-shaped member.

Therefore, the flow amount characteristic of the pump becomes smooth, then the smooth pressure increase characteristic of the pump can be realized.

(A8) In the pump device of (A1), the pulsation reduction unit 3 has a plurality of the second orifices 302.

It is therefore possible to meet an even larger required flow amount, thereby improving the discharge performance of the pump.

(A9) In the pump device of (A1), the first orifice is a fixed orifice, and the second orifice is a variable orifice.

Therefore, the flow amount characteristic of the pump becomes smooth, then the smooth pressure increase characteristic of the pump can be realized.

(B1) The pump device has the pulsation absorption unit which reduces pulsation of brake fluid discharged from the pump. The pulsation reduction unit 3 has the first orifice which is provided on the discharge oil passage of the pump, and through which the discharged brake fluid passes; and the relief mechanism which is provided parallel to the first orifice and opens when the flow amount of the discharged brake fluid becomes greater than the predetermined flow amount.

Therefore, in the small flow amount region where the flow amount is equal to or less than the predetermined flow amount, the pulse pressure is reduced by the first orifice, then the quietness can be improved. Further, in the large flow amount region where the flow amount is greater than the predetermined flow amount, the relief mechanism opens then the pressure increase performance is improved, thereby improving the discharge performance.

(B2) In the pump device of (B1), the second orifice is provided in series with the relief mechanism.

It is thus possible to reduce the pulse pressure in a wide range from the small flow amount region to the large flow amount region.

(B3) In the pump device of (B2), the first orifice and the second orifice are fixed orifices.

Thus, the same effect as (A3) can be obtained.

(B4) In the pump device of (B3), the pump has the delivery valve that allows only the flow of the brake fluid in the discharge direction of the pump, and the pulsation reduction unit is provided at the downstream side of the delivery valve.

Thus, the same effect as (A2) can be obtained.

(B5) In the pump device of (B2), the pulsation reduction unit has the diaphragm which is provided in the space provided on the discharge oil passage and divides the space into two chambers at the upstream side and the downstream side; and the spring element which elastically supports the diaphragm in the space. The first orifice and the second orifice are formed by penetrating the diaphragm. The relief mechanism has the valve body by which the oil passage leading to the first orifice and the oil passage leading to the second orifice are separated in the space. When the flow amount becomes greater than the predetermined flow amount, the valve body allows the flow of the brake fluid from the discharge oil passage to the second orifice.

Thus, the same effect as (A5) can be obtained.

(C1) The pump device has: the first fixed orifice that is provided on the discharge oil passage of the pump; and the second fixed orifice that, when the discharge flow amount of brake fluid of the pump becomes greater than the predetermined flow amount, allows pass of the brake fluid.

Thus, the same effect as (A3) can be obtained.

(C2) In the pump device of (C1), the first fixed orifice and the second fixed orifice are arranged parallel to each other with reference to the flow of the brake fluid.

Therefore, the effect of (C1) can be surely obtained.

(C3) In the pump device of (C2), the space is provided on the discharge oil passage. The diaphragm that divides the space into two chambers at the upstream side and the downstream side is provided in the space. The spring element that elastically supports the diaphragm in the space is provided. The first fixed orifice and the second fixed orifice are formed by penetrating the diaphragm. A valve body by which the oil passage leading to the first fixed orifice and the oil passage leading to the second fixed orifice are separated in the space is provided. When the discharge flow amount becomes greater than the predetermined flow amount, the valve body allows the flow of the brake fluid from the discharge oil passage to the second fixed orifice.

Thus, the same effect as (A5) can be obtained.

(C4) In the pump device of (C3), the pump has the delivery valve that allows only the flow of the brake fluid in the discharge direction of the pump, and the space is provided at the downstream side of the delivery valve.

Thus, the same effect as (A2) can be obtained.

(C5) In the pump device of (C4), the space is the ring-shaped space. The discharge oil passage is set at the position including the center of the ring-shaped space. The diaphragm is the ring-shaped diaphragm. The spring element is the ring-shaped elastic body that is placed between the downstream side wall of the space and the diaphragm. The second fixed orifice is set at the outer peripheral side with respect to the first fixed orifice. The valve body is the ring-shaped member that is placed between the upstream side wall of the space and the diaphragm and positioned between the first fixed orifice and the second fixed orifice.

Thus, the same effect as (A6) can be obtained.

(C6) In the pump device of (C5), the diaphragm has the third fixed orifice that is provided parallel to the second fixed orifice, and allows pass of the brake fluid when the discharge flow amount is greater than the predetermined flow amount.

Thus, the same effect as (A8) can be obtained.

EXPLANATION OF REFERENCE

2 . . . pump
3 . . . pulsation reduction unit
30 . . . diaphragm
301 . . . first orifice
302 . . . second orifice
31 . . . spring element
32 . . . relief mechanism
320 . . . valve body
4 . . . check valve (delivery valve)
12 . . . pipe (discharge oil passage)
12c . . . space

The invention claimed is:

1. A pump device including a pulsation reduction unit, which reduces pulsation of brake fluid discharged from a pump, the pulsation reduction unit comprising:
a dividing plate, movably located in a space provided on a discharge oil passage of the pump, dividing the space into an upstream side chamber and a downstream side chamber;
a spring element configured to engage a wall portion of the space and perform a sealing function that stops leakage of the brake fluid between the upstream side chamber and the downstream side chamber through a gap located at an outer peripheral side of the dividing plate;
a valve body provided in the upstream side chamber, defining a first chamber to which the discharge oil passage opens and a second chamber to which the discharge oil passage does not open in the upstream side chamber by closing when a flow amount of the brake fluid discharged from the pump is equal to or less than a predetermined flow amount, the valve body opening when the flow amount of the discharged brake fluid is greater than the predetermined flow amount;
a first orifice, which is formed by penetrating the dividing plate, that opens to the first chamber; and
a second orifice, which is formed by penetrating the dividing plate, that opens to the second chamber;
wherein:
when the flow amount of the discharged brake fluid is greater than the predetermined flow amount, the dividing plate moves forward and backward in response to a hydraulic pressure variation due to pulsation of the discharged brake fluid with the valve body open.

2. The pump device as claimed in claim 1, wherein:
the pump has a delivery valve that allows only a flow of the brake fluid in a discharge direction of the pump, and
the pulsation reduction unit is provided at a downstream side of the delivery valve.

3. The pump device as claimed in claim 1, wherein:
the pulsation reduction unit has a third orifice, which is provided parallel to the second orifice and through which, when the flow amount becomes a second predetermined flow amount that is greater than the predetermined flow amount, the brake fluid passes.

4. A pulsation reduction unit for a pump device, the pulsation reduction unit reducing pulsation of brake fluid discharged from a pump and comprising:
a dividing plate, movably located in a space provided on a discharge oil passage of the pump, dividing the space into an upstream side chamber and a downstream side chamber;
a spring element configured to engage a wall portion of the space and perform a sealing function that stops leakage of the brake fluid between the upstream side chamber and the downstream side chamber through a gap located at an outer peripheral side of the dividing plate;

a valve body provided in the upstream side chamber, defining a first chamber to which the discharge oil passage opens and a second chamber to which the discharge oil passage does not open in the upstream side chamber by closing when a flow amount of the brake fluid discharged from the pump is equal to or less than a predetermined flow amount, the valve body opening when the flow amount of the discharged brake fluid is greater than the predetermined flow amount;

a first orifice, which is formed by penetrating the dividing plate, that opens to the first chamber; and a second orifice, which is formed by penetrating the dividing plate, and which opens to the second chamber.

5. The pulsation reduction unit for the pump device as claimed in claim 4, wherein:

the pump has a delivery valve that allows only a flow of the brake fluid in a discharge direction of the pump, and the pulsation reduction unit is provided at a downstream side of the delivery valve.

6. A pump device including a pulsation reduction unit, which reduces pulsation of brake fluid discharged from a pump, the pulsation reduction unit comprising:

a dividing plate, movably located in a space provided on a discharge oil passage of the pump, dividing the space into an upstream side chamber and a downstream side chamber;

a spring element configured to engage a wall portion of the space and perform a sealing function that stops leakage of the brake fluid between the upstream side chamber and the downstream side chamber through a gap located at an outer peripheral side of the dividing plate;

a valve body provided in the upstream side chamber, defining a first chamber to which the discharge oil passage opens and a second chamber to which the discharge oil passage does not open in the upstream side chamber by closing when a flow amount of the brake fluid discharged from the pump is equal to or less than a predetermined flow amount, the valve body opening when the flow amount of the discharged brake fluid is greater than the predetermined flow amount;

a first fixed orifice, which is formed by penetrating the dividing plate, that opens to the first chamber; and a second fixed orifice, which is formed by penetrating the dividing plate, that opens to the second chamber.

7. The pump device as claimed in claim 6, wherein:

the first fixed orifice and the second fixed orifice are arranged parallel to each other with reference to a flow of the brake fluid.

8. The pump device as claimed in claim 7, wherein:

the pump has a delivery valve that allows only a flow of the brake fluid in a discharge direction of the pump, and the space is provided at a downstream side of the delivery valve.

9. The pump device as claimed in claim 8, wherein:

the dividing plate has a third fixed orifice, which is parallel to the second fixed orifice and through which, when the discharge flow amount becomes a second predetermined flow amount that is greater than the predetermined flow amount, the brake fluid passes.

* * * * *